US012809569B2

(12) United States Patent
Nag et al.

(10) Patent No.: US 12,809,569 B2
(45) Date of Patent: Nov. 24, 2026

(54) METHODS AND SYSTEMS FOR FACILITATING USER PARTICIPATION IN CONTENT ENGAGEMENT ACTIVITIES

(71) Applicant: Google LLC, Mountain View, CA (US)

(72) Inventors: Aditya Nag, San Francisco, CA (US); Christopher David Patrick Cooke, Half Moon Bay, CA (US); Ken Hy Kha Thai, Los Altos, CA (US); Sana Mithani, Plantation, FL (US); Aran Mun, Oakland, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 18/801,349

(22) Filed: Aug. 12, 2024

(65) Prior Publication Data

US 2024/0402978 A1 Dec. 5, 2024

Related U.S. Application Data

(63) Continuation of application No. 17/745,825, filed on May 16, 2022, now Pat. No. 12,061,834.

(51) Int. Cl.

| | |
|---|---|
| ***G06F 3/14*** | (2006.01) |
| ***H04L 65/401*** | (2022.01) |
| ***H04L 65/403*** | (2022.01) |

(52) U.S. Cl.

CPC .......... *G06F 3/1462* (2013.01); *G06F 3/1415* (2013.01); *H04L 65/4015* (2013.01); *H04L 65/403* (2013.01)

(58) Field of Classification Search

None

See application file for complete search history.

(56) References Cited

U.S. PATENT DOCUMENTS

| | | | | |
|---|---|---|---|---|
| 10,015,442 | B1 * | 7/2018 | Maltezos | H04N 7/147 |
| 10,194,189 | B1 | 1/2019 | Goetz et al. | |
| 2008/0080679 | A1 | 4/2008 | Fernandez et al. | |

(Continued)

FOREIGN PATENT DOCUMENTS

| | | | |
|---|---|---|---|
| WO | 2021201863 | A1 | 10/2021 |

OTHER PUBLICATIONS

Zoom Application—Guidance Documentation, Dec. 6, 2021, https://explore.zoom.us/media/zoom-video-communications-guidance-document-2021-12-06.pdf, pp. 6-7, 10-12, 14, 21, 23-24, 29 (Year: 2021).*

(Continued)

*Primary Examiner* — Kirk W Hermann

(74) *Attorney, Agent, or Firm* — Lowenstein Sandler LLP

(57) ABSTRACT

Systems and computer readable mediums are provided that involve operations including providing, via a user interface (UI) of a first application on a first screen device, a UI element prompting a user to connect the first screen device with a second screen device that is presenting a video to the user, receiving, via the UI element, an indication of a user request to connect the first screen device with the second screen device, causing the first screen device to be paired with the second screen device, and providing, for presentation in the UI of the first application of the first screen device, on or more comments provided by one or more other users for the video that is concurrently presented on the second screen device.

24 Claims, 10 Drawing Sheets

(56) References Cited

U.S. PATENT DOCUMENTS

2011/0276698 A1* 11/2011 Bigioi ................ H04N 1/00278
709/227
2012/0038678 A1 2/2012 Hwang et al.
2012/0144416 A1 6/2012 Wetzer et al.
2013/0040623 A1* 2/2013 Chun ............... H04N 21/42208
455/414.2
2013/0242031 A1* 9/2013 Petterson ............... H04N 7/157
348/14.07
2014/0032635 A1* 1/2014 Pimmel ............ H04N 21/44227
709/227
2014/0320398 A1 10/2014 Papstein
2015/0123811 A1 5/2015 Hernandez-Rosas et al.
2015/0296245 A1 10/2015 Toh et al.
2015/0373760 A1 12/2015 Palin et al.
2017/0223069 A1* 8/2017 Arora .................... G06F 3/0486
2018/0014076 A1* 1/2018 Shanson ............ H04N 21/4821
2018/0262793 A1 9/2018 Lau et al.
2018/0288811 A1 10/2018 Witkowski et al.
2020/0375457 A1 12/2020 Van Tassel et al.
2022/0004315 A1* 1/2022 Zhang ................... G06F 3/0482
2024/0205507 A1* 6/2024 Xu ........................ H04N 21/472
2024/0354044 A1* 10/2024 Lu ....................... H04N 21/4312

OTHER PUBLICATIONS

International Search Report and Written Opinion for International Application No. PCT/US2023/022283, mailed Oct. 2, 2023, 17 Pages.

Oneplus India: “OnePlus Connect App for Oneplus TV,” Oct. 4, 2019, Receieved from URL: https://www.youtube.com/watch7v-8JkL8R6YxM.

Samsung: “Samsung Smart View,” 5 Pages, [Retrieved on May 16, 2022] Retrieved from URL: https://www.samsung.com/in/apps/tv/smart-view.

* cited by examiner

METHODS AND SYSTEMS FOR FACILITATING USER PARTICIPATION IN CONTENT ENGAGEMENT ACTIVITIES

RELATED APPLICATIONS

This application is a continuation application of co-pending U.S. patent application Ser. No. 17/745,825, filed May 16, 2022, which is incorporated herein by reference.

TECHNICAL FIELD

Aspects and implementations of the present disclosure relate to methods and systems for facilitating user participation in content engagement activities, specifically utilizing a first user device to facilitate user participation in content presented by a second user device.

BACKGROUND

A platform (e.g., a content sharing platform) can transmit (e.g., stream) media items to client devices connected to the platform via a network. Different types of client devices may be optimized for different tasks, preferred by a user for different tasks, or the like. For example, a first client device may provide a preferred viewing experience for a media item, while a different client devices provides a preferred experience for further engagement associated with the media item.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

A system and method are disclosed for facilitating user participation in one or more engagement activities associated with a media item. In some implementations, a method includes providing, via a first user interface (UI) of a first application on a first device, a UI element prompting a user to connect the first device with a second device that is presenting a media item (e.g., content item) to the user. The method further includes receiving, via the UI element, an indication of a user request to connect the first device with the second device. The method further includes, in response to receiving the indication of the user request to connect the first device with the second device, causing the first device to be paired with the second device. The method further includes providing, for presentation in the UI of the first application of the first device, one or more elements to facilitate one or more engagement activities associated with the media item concurrently presented on the second device.

In some implementations, the UI element prompting the user to connect the first device with the second device may be provided via the UI of the first application of the first device responsive to the user selecting an option to participate in an engagement activity associated with the video presented on the second device. The engagement activity may include viewing one or more comments for the video presented on the second device. The UI element may prompt the user to connect the first device with the second device to participate in the selected activity. The UI element may prompt the user to connect the first device with the second device to view comments.

In some implementations, providing the UI element prompting the user to connect the first device with the second device may include providing, via a second UI of a second application on the second device, an indication of an option to participate in an engagement activity associated with the content presented on the second device. Participating in the engagement activity may include viewing one or more comments. The content presented may include a video. Providing the UI element may further include receiving, via the UI of the second application of the second device, a user selection of the option to participate in one or more engagement activities associated with the presented content. The user selection may include a selection to view one or more comments for a video presented by the second device. Providing the UI element may further include causing the UI element prompting the user to connect the first device with the second device to be presented in the first UI of the first application of the first device. Causing the UI element to be presented may be performed in response to the user selection of the option to participate in the engagement activity. Causing the UI element to be presented may be performed in response to a user selection to view one or more comments for a video presented on the second device.

In some implementations, providing the UI element prompting the user to connect the first device with the second device may include detecting a user action with respect to the first application of the first device. The first application is associated with a first user account. Providing the UI element may further include determining whether a second application on the second device is associated with the first user account and is presenting the video. Determining whether a second application is associated with the first user account may be performed in response to the detected user action. Providing the UI element may further include causing the UI element prompting the user to connect the first device with the second device to be presented on the first UI of the first application. Causing the UI element to be presented may be performed in response to determining that the second application is associated with the first user account and is presenting the video.

In some implementations, the user action may include at least one of the user opening the first application on the first device or the user selecting the first application from a list of applications opened on the first device to move the first application from a background mode to an active mode.

In some implementations, the method may further include, prior to causing the UI element prompting the user to connect the first device to the second device to be presented on the first UI of the first application, determining that the user has not dismissed a previous prompt to connect the first device to the second device. The method may include determining that the user has not dismissed a previous prompt for a threshold amount of time. The method may include determining that the user has not dismissed a previous prompt during a current watch session.

In some implementations, causing the first device to be paired with the second device may include generating a first connection between the first device and a server. Causing the first device to be paired with the second device may include generating a second connection between the second device and the server.

In some implementations, the method may further include receiving, via the first UI of the first application on the first device, a user request to adjust presentation of the content on the second device. Responsive to the user request to adjust presentation of the content presented on the second device, the method may further include causing presentation of the video on the second device to be adjusted.

In some implementations, the method may further include identifying a plurality of comments provided by a plurality of users associated with the content presented on the second device. The plurality of comments may comprise the one or more comments provided by the one or more other users.

In some implementations, the method may further include receiving, via the first UI of the first application of the first device, a new comment of the user with respect to the video that is concurrently presented on the second device.

In some implementations, the method may further include receiving, via the UI of the first application of the first screen device, an indication of feedback of the user with respect to at least one of the one or more comments provided by the one or more other users for the video that is concurrently presented on the second screen device. The feedback may include an indication of a user approval or disapproval of a respective comment.

In another aspect of the disclosure, a method includes providing, in a UI of a first application on a first screen device, a UI element prompting the user to connect the first screen device with a second screen device that is presenting a video to the user. The method further includes receiving, via the UI element, an indication of a user request to connect the first screen device with the second screen device. The method further includes causing the first screen device to be paired with the second screen device. Causing the first screen device to be paired with the second screen device may be performed in response to receiving the indication of the user request to connect the first screen device to the second screen device. The method may further include identifying one or more live chats associated with the video presented on the second screen device. The method further includes allowing, via the first screen device, the user to participate in a live chat between a plurality of other users with respect to the video that is concurrently presented on the second screen device. The method may further include receiving, via the UI of the first application of the first screen device, a message of the sure with respect to the video that is concurrently presented on the second device, and causing the message of the user to be included in the live chat associated with the video.

In some implementations, the UI element prompting the user to connect the first screen device with the second screen device may be provided responsive to the user selecting an option to participate in the live chat between the plurality of other viewers with respect to the video presented on the second screen device. The UI element prompts the user to connect the first screen device with the second screen device to participate in a live chat.

In some implementations, providing the UI element prompting the user to connect the first screen device with the second screen device may include detecting a user action with respect to the UI on the first screen device. The first application of the first screen device is associated with a first user account. The detected action may include opening the first application or selecting the first application to be moved from a background mode to an active mode. Providing the UI element may further include determining whether a second application on the second screen device is associated with the first user account and is presenting the video. Providing the UI element may further include causing the UI element to be presented on the UI of the first application.

In another aspect of the disclosure, a method includes determining whether a first user account identifier associated with a first application on a first screen device matches a second user account identifier associated with a second application on a second screen device. The second application is presenting a content item to a user. The content item may be a video. The method further includes providing, via a UI of the first application on the first screen device, a UI element prompting the user to connect the first screen device with the second screen device. Providing the UI element may be performed in response to determining that the first user account identifier associated with the first application on the first screen device matches the second user account identifier associated with the second application on the second screen device. The method may further include receiving, via the UI element, an indication of a user request to connect the first screen device with the second screen device. The method further includes causing the first screen device to be paired with the second screen device. Causing the devices to be paired is performed in response to receiving the indication of the user request. The method further includes providing, for presentation in the user interface of the first application on the first screen device, additional information associated with the video that is concurrently presented on the second screen device.

In some implementations, determining whether a first user account identifier associated with a first application on a first screen device matches a second user account identifier associated with a second application on a second screen device may include receiving, from the second screen device, a first message. The first message may include an indication that the video is being presented by the second device. The first message may include the second account identifier. Determining whether the user account identifiers match may further include receiving from the first screen device a second message. The second message may include the first user account identifier. Determining whether the user account identifiers match may further include determining that a first user account associated with the first user account identifier and a second user account associated with the second user account identifier are the same user account.

In some implementations, the second message including the first user account identifier may be sent responsive to a user action. The user action may be one or more of the user opening the first application on the first screen device or the user selecting the first application to move from a background mode to an active mode.

In some implementations, the method may further include determining that the user has not dismissed a previous prompt to connect the first screen device to the second screen device. The method may include determining that the user has not dismissed a previous prompt to connect the first screen device to the second screen device in a threshold span of time. The method may include determining that the user has not dismissed a previous prompt to connect the first screen device to the second screen device during a current watch session.

In another aspect of the disclosure, a method includes providing a plurality of options available via a first UI of a first application of a first screen device with respect to a video presented via a second application on a second screen device, wherein the plurality of options are presented on a second UI of the second application on the second screen device. The method further includes receiving, via the second UI of the second application on the second screen device, a user selection of one of the plurality of options available on the first screen device with respect to the video presented via the second application on the second screen device. The method may further include providing, via the first UI of the first application on the first screen device, a first UI element prompting a user to connect the first screen device with the second screen device to participate in an activity associated with the one or the plurality of options associated with the user selection. The method may further include receiving, via the first UI element, an indication of a user request to connect the first screen device with the second screen device to participate in the activity associated with the one of the plurality of options associated with the user selection. The method further includes causing the first screen device to be paired with the second screen device. The method further includes providing to the user via the first UI of the first application on the first screen device a second UI element to facilitate participation in the activity associated with the one of the plurality of options associated with the user selection on the first screen device. Providing the second UI element and causing the devices to be paired are performed responsive to receiving the indication of the user request to connect the first screen device with the second screen device to participate in the activity associated with the one of the plurality of options associated with the use selection.

In some implementations, the plurality of options may include one or more of engaging with comments associated with the video, providing feedback on the video, sharing the video, participating in a live chat associated with the video, or facilitating a transaction associated with the video. Providing the first UI element on the first UI of the first screen device may include, responsive to detecting a user action with respect to the first application, transmitting an indication of the user selection of one of the plurality of options available on the first screen device to the first screen device. The first application is associated with a first user account. The user action may include opening the first application or selecting the first application to be moved from a background mode to an active mode.

Optional features of one aspect may be combined with other aspects where appropriate.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
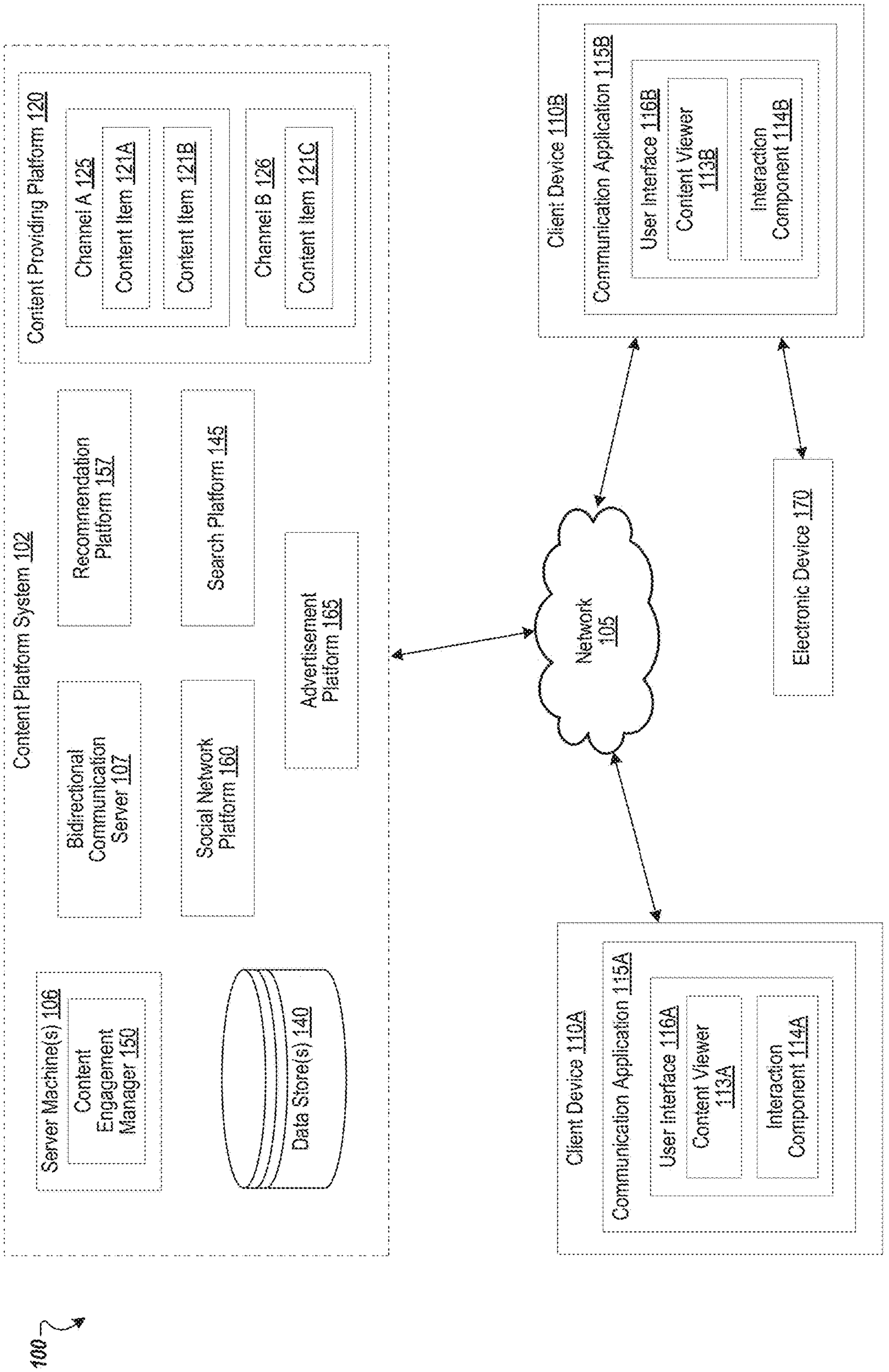
FIG. 1 illustrates an example system architecture for providing related content to multiple client devices, according to some embodiments.

Aspects of the present disclosure relate to methods and systems for facilitating user participation in one or more engagement activities associated with a content item. A platform (e.g., a content sharing platform, etc.) can enable a user to access a media item (e.g., a video item, an audio item, etc.) hosted by the platform (e.g., via a client device connected to the platform). The platform can provide a client device of the user with access to the media item (e.g., by transmitting the media item to the client device of the user, etc.) via the network.

A media/content item may have one or more additional associated activities that can deepen the engagement of a user with the content item. For example, engagement activities may include a comments section for the content item, a live chat associated with the content item, etc.

In some embodiments, a user may engage with the content of a content platform utilizing a variety of devices, dependent on, for example, the type of content the user wishes to consume, the time of day or day of the week, the location of the user, the amount of time the user has available, etc. Different user devices may be more or less apt for particular tasks associated with a content item. For example, a television (e.g., a smart TV) with access to a content sharing platform (e.g., via an application installed on the television) may provide a positive experience for viewing video content, an internet of things device may provide a positive experience for listening to audio content, etc. Deeper engagement with a content item, e.g., participation in associated activities, may be better performed on a separate device, e.g., a device with a physical or virtual keyboard, a device with more fluid user control options, or the like.

In some systems, it may be inconvenient or impossible to participate in one or more activities associated with a content item using a particular device. In one example, a user may find that their mobile phone provides a good experience for participating in a live chat associated with a video. However, the user may find that the mobile phone is not an ideal medium for watching the video, e.g., due to the small screen size of the mobile phone. In a further example, a user may find that a gaming console with output to a television is a convenient way to consume content items, e.g., videos. However, utilizing the gaming console for deeper engagement activities may be cumbersome or impossible (e.g., navigating a virtual keyboard using a gaming console remote controller may be difficult, an application executed by a gaming console may not allow for participation in one or more activities associated with a content item, etc.).

In conventional systems, a user may consume content and engage in related activities on separate devices by navigating each to the relevant content item. For example, a user may use an application installed on their television (first device) to navigate to a target video. The user may cause the video to be presented on the television. The user may then open an application on a mobile phone (second device) corresponding to the application on the television. The user may then navigate the application on the mobile phone to the same content item to participate in one or more engagement activities associated with the content item. In another example, a user may utilize a first device to present an audio podcast to the user. The first device may be an audio device, e.g., a voice-activated internet of things device. The user may be unable to participate in further engagement activities via the first device, it may be cumbersome to participate in further engagement activities using the first device, etc. The user may use a second device, such as a laptop computer, to navigate to the same content item (e.g., using an internet browser, an installed application, etc.), and participate in an engagement activity (e.g., writing a review of the podcast). However, conventional systems do not provide an efficient and user-friendly mechanism for pairing the two devices. For example, currently a user usually has to ensure that a first device to be used for presenting content (e.g., a smart TV) and a second device to be connected to the first device are connected to the same wireless network (e.g., WLAN network). The user has to navigate the TV settings to turn on a pairing option. The user has to open display setting on the second device (e.g., a mobile phone) to turn on a pairing option. The user then selects the first device from a list of devices. The user then performs other operations to complete the pairing, such as entering a code displayed on the first device into a UI element of the second device. This multi-step process is cumbersome for the user and requires significant computing resources. Additionally, conventional systems only provide a limited set of options for deeper engagement, via a second device, for a user watching or listening to content on a first device. Further, for those engagement options that are currently available via a second device, the user has to manually navigate, on the second device, to the content presented on the first device, which takes up extra time and additional computing resources. Additionally, a connection between devices may be initiated conventionally on a device that may be more convenient for participating in engagement activities, and presentation of the content may be shifted from one device (e.g., a mobile phone) to another device (e.g., a smart TV).

Aspects of the present disclosure may address one or more of these deficiencies of conventional systems. A platform (e.g., a content sharing platform) can host one or more media items (e.g., video items, image items, audio items, etc.) to be provided to one or more users of the platform (e.g., via client devices associated with the one or more users). In some embodiments, a media item can correspond to a media file (e.g., a video file, and audio file, etc.). In other or similar embodiments, a media item can correspond to a portion of a media file (e.g., a portion or a chunk of a video file, an image file, an audio file, etc.).

A user may select a content item to consume (e.g., select an item corresponding to one or more digital files to be presented in a user interface (UI) for the user). The content item may be presented to the user. Presentation of the content item may be performed via a video display. Presentation of the content item may be performed via an audio device, e.g., a podcast, music, radio show, etc. Presentation of the content item may be performed via combination of mediums, e.g., video and audio displays, such as to present pre-recorded video content, live-streamed video content, etc. The user may wish to participate in one or more engagement activities associated with the presented content item. Engagement activities may include, for example, viewing or entering comments (e.g., text comments) associated with the content item; participating in a live chat associated with the content item; providing or viewing feedback (e.g., like/dislike, written or graded review, etc.) associated with the video, with a comment, or the like; engaging in a transaction associated with the content item (e.g., subscribing to a channel providing the content item, donating to a cause associated with the content item, purchasing one or more items associated with the content item, etc.); interacting with one or more advertisements associated with the content item, or the like.

In some embodiments, a user may connect or pair multiple devices for participating in various activities associated with the content item. Responsive to the user selecting a content item, causing a content item to be presented, etc., an element (e.g., a UI element) may be provided to the user, prompting the user to connect devices. In some embodiments, the device presenting the content item may cause a message to be sent to another device, initiating a connection between the devices. In some embodiments, the device presenting the content item may provide data indicative of the presented content (e.g., for storage by a server associated with the content sharing platform), and another device of the user may request that data and, responsive to receiving the stored data, present a UI element to the user prompting them to request that the devices be connected. In some embodiments, the data provided by the device presenting the content item includes such information as a user account associated with the device presenting the content, a user account that an application used to present the content item is signed in to, etc. A determination may be made that the user account associated with the device presenting the content item is also associated with a device that may be connected to the device presenting the content item. The UI element may be presented responsive to determining that the user account associated with the device presenting the content is related to (e.g., the same as, included in a family plan with, etc.) a user account associated with the device that is to present the UI element. Once connected, a user may engage in one or more activities associated with the content item on one device (e.g., may watch a video on a television) and engage in one or more other activities associated with the content item on another device (e.g., may be presented with a field for performing a transaction associated with the video on a mobile phone). In some embodiments, a connection between the devices may be generated without presenting a UI element prompting the user to connect the devices. For example, upon a user opening an application associated with the content item on the second device, a connection between the devices may be generated.

In some embodiments, a user may utilize a UI presenting a content item to select an engagement activity to participate in. The device presenting the content item may cause data indicative of the selected activity to be stored (e.g., by a server). Another device may request the stored data and present to the user an element prompting the user to connect the devices to participate in the selected engagement activity. In some embodiments, a connection between devices may be generated without presenting a prompt to the user on the second device. For example, responsive to the user utilizing the UI presenting a content item to select an engagement activity, upon accessing the content platform, an application associated with the content, or the like on a second device, the devices may be connected.

Aspects of the present disclosure result in technical advantages over conventional methods. As discussed above, conventional systems usually use a multi-step process requiring a user to (i) ensure that both devices are connected to the same wireless network, (ii) navigate the TV settings to turn on a pairing option, (iii) open display setting on the mobile phone to turn on a pairing option, (iv) select the first device from a list of devices, and (v) perform other operations to complete the pairing (e.g., entering a code displayed on the first device into a UI element of the second device). In contrast, aspects of the present disclosure can automatically determine that a user may be interested in connecting the two devices (e.g., based on the user account used to watch a video on the TV matching the user account used to open a related application on the mobile device), and provide a prompt to the user asking the user to confirm that the two devices should be connected. The user then only needs to view the prompt and select an option confirming the user request to connect the two devices. As a result, significant time and computing resources are saved, some restrictions for pairing devices are removed, and a simpler and more convenient mechanism to initiate device pairing is provided to the user. In addition, aspects of the present disclosure may include using a history of a user (e.g., prompts to connect that are accepted or rejected, a record of which devices have been paired to other devices, etc.) to present more informed prompts (e.g., prompts more likely to be aligned with user preference) to the user, thereby improving user experience and saving computing resources that would be otherwise consumed to generate prompts not wanted by the user.

Further, by accepting input on one device for performance on another device (e.g., selection of an engagement activity to participate in), aspects of this disclosure are able to present the desired content and/or activity to a user more quickly and more easily than otherwise possible. A user may be consuming a content item on a device that is not preferred by the user for one or more engagement activities. For example, a user may watch a video on a smart TV. Upon consuming the content, the user may want to participate in an associated activity. For example, the user may want to contribute to a comment section associated with the content item, participate in a live chat associated with the content item, purchase a product referenced in the content item, etc. Aspects of the present disclosure allow the user to select the engagement option using the device presenting the content, and perform the activity associated with the option on another device better suited for the activity (e.g., a mobile phone). The second device may present a prompt inviting the user to participate in the activity without any navigation on the user's part within the application on the device, thereby improving user experience and saving computing resources that would be otherwise consumed by navigation activity.

FIG. 1 illustrates an example system architecture 100 for providing related content to multiple client devices, according to some embodiments. System architecture 100 includes client devices 110A and 110B (in some embodiments, more client devices may be included, e.g., devices 110C, 110D, etc.), one or more networks 105, content platform system 102, and one or more electronic devices 170. Content platform system 102 includes one or more server machines 106, bidirectional communication server 107, one or more data stores 140, and may include a variety of platforms targeted at performing tasks (e.g., tasks associated with content delivery). Platforms of content platform system 102 may be hosted by one or more server machines 106. Platforms of content platform system 102 may include and/or be hosted on one or more computing devices (such as a rackmount server, a router computer, a server computer, a personal computer, a mainframe computer, a laptop computer, a tablet computer, a desktop computer, etc.) and one or more data stores (e.g., hard disks, memories, and databases) and may be coupled to the one or more networks 105. In some embodiments, components of content platform system 102 (e.g., server machines 106, data stores 140, hardware associated with one or more platforms, etc.) may be directly connected to one or more networks 105. In some embodiments, one or more components of content platform system 102 may access networks 105 via another device, e.g., a hub, switch, etc. Data stores 140 may be included in one or more server machines 106, include external data storage, etc. Platforms of content platform system 102 may include advertisement platform 165, social network platform 160, recommendation platform 157, search platform 145, and content providing platform 120.

The one or more networks 105 may include one or more public networks (e.g., the Internet), one or more private networks (e.g., a local area network (LAN), a wide area network (WAN), one or more wired networks (e.g., Ethernet network), one or more wireless networks (e.g., an 802.11 network), one or more cellular networks (e.g., a Long Term Evolution (LTE) network), routers, hubs, switches, server computers, and/or a combination thereof. In one implementation, some components of architecture 100 are not directly connected to each other. In one implementation, system architecture 100 includes separate networks 105.

The one or more data stores 140 may reside in memory (e.g., random access memory), cache, drives (e.g., hard drive), flash drives, etc., and may be part of one or more database systems, one or more file systems, or another type of component or device capable of storing data. The one or more data stores 140 may include multiple storage components (e.g., multiple drives or multiple databases) that may also span multiple computing devices (e.g., multiple server computers). The data store may be persistent storage that is capable of storing data. A persistent storage may be a local storage unit or a remote storage unit, electronic storage units (e.g., main memory), or a similar storage unit. Persistent storage may be a monolithic device or a distributed set of devices.

Content items 121A-C (e.g., media content items) may be stored on one or more data stores. The data stores may be part of one or more platforms. Examples of a content item 121 may include, and are not limited to, digital video, digital movies, animated images, digital photos, digital music, digital audio, digital video games, collaborative media content presentations, website content, social media updates, electronic books, electronic journals, digital audio books, web blogs, software applications, etc. Content items 121A-C may also be referred to as media items. Content items 121A-C may be pre-recorded or live-streamed. For brevity and simplicity, a video may be used as an example of a content item 121 throughout this document.

Content items 121A-C may be provided by content providers. A content provider may be a user, a company, an organization, etc. A content provider may provide a content item 121 that is a video. A content provider may provide content item 121 that comprises live-streamed content, e.g., content item 121 may include live-streamed video, a live chat associated with the video, etc.

Client devices 110 may include devices, such as televisions, smart phones, personal digital assistants, portable media players, laptop computers, electronic book readers, tablet computers, desktop computers, gaming consoles, set-top boxes, or the like.

A client device 110A (110B, 110C, etc.) may include a communication application 115A. A content item 121 may be consumed by a user via the communication application 115. For example, communication application 115A may access one or more networks 105 (e.g., the internet) via hardware of client device 110A to provide content item 121 to the user. As used herein, "media," "media item," "online media item," "digital media," "digital media item," "content," "media content item," and "content item" may include an electronic file that can be executed or loaded using software, firmware, and/or hardware configured to present a content item. In one implementation, the communication applications 115 may be applications that allow users to compose, send, and receive content items 121 (e.g., videos) over a platform (e.g., content sharing platform 120, recommendation platform 157, advertisement platform 165, social network platform 160, and/or search platform 145) and/or a combination of platforms and/or networks.

In some embodiments, the communication applications 115 may be social networking applications, video sharing applications, video streaming applications, video game streaming applications, photo sharing applications, chat applications, or a combination of such applications. The communication applications 115 associated with client devices 110 may render, display, present and/or play one or more content items 121 to one or more users. For example, communication applications 115A and 115B may provide user interfaces 116A and 116B (e.g., a graphical user interface) to be displayed on endpoint devices 110A and 110B for receiving, and/or playing video content. In some embodiments, communication applications 115A and 115B are related applications that are each associated with (and managed by) content platform 102 or content proving platform 120, provide some overlapping features and are designed to support different types of client devices 110A and 110B respectively (e.g., mobile phone type and TV type).

In some embodiments, communication applications 115A-B may include content viewers 113A-B and interaction components 114A-B. User interfaces 116A-B may display content viewers 113A-B and interaction components 114A-B. Interaction components 114 may allow a user to interact with content, interact with platforms of content platform system 102, etc. In some embodiments, interaction components 114 may include search components, e.g., a field a user may utilize to search for target content item 121, a target content channel (e.g., channel A 125), content item 121 associated with a target topic, etc. In some embodiments, a search component may provide a user with a virtual keyboard to facilitate user input. In some embodiments, multiple content viewers 113 and/or interaction components 114 may be associated with one user interface, communication application, client device, etc. For example, multiple content items may be displayed for a user at once. In some embodiments, multiple interaction components 114 may be associated with a content item 121. For example, a video may have associated comments and/or live chat features, feedback mechanics (e.g., a like/dislike button, upvote/downvote, etc.), review mechanics (e.g., written reviews of the content, scored reviews of the content, etc.), transaction options (e.g., channel subscription, donation, affiliated product purchasing, etc.), or the like. In some implementations, application 115 is a web browser that can access, retrieve, present, and/or navigate content (e.g., web pages such as Hyper Text Markup Language (HTML) pages, digital media items, etc.) and can include interaction component 114 and content viewer 113, which may be an embedded media player that is embedded in user interface 116 (e.g., a web page associated with viewing content) provided by content providing platform 120. Alternatively, application 115 is not a web browser and is a stand-alone application (e.g., mobile application, desktop application, gaming console application, television application, etc.), that is downloaded from a platform (e.g., content providing platform 120, recommendation platform 157, advertisement platform 165, social network platform 160, or search platform 145) or pre-installed on the client device 110. The stand-alone application 115 can provide user interface 116 including content viewer 113 (e.g., embedded media player) and interaction component 114. It will be understood that components and elements associated with client device 110B (e.g., communication application 115B, user interface 116B, etc.) may have similar features as those described as exemplary features of components and elements associated with client device 110A.

Electronic device 170 may be any suitable electronic device capable of communicating inputs to client device 110B. For example, electronic device 170 may include a remote controller, a gaming controller, etc. Electronic device 170 may include one or more directional input devices, e.g., arrow keys, a directional stick, etc. Electronic device 170 may transmit input to client device 110B for processing by one or more processors associated with client device 110B.

In some embodiments, client devices 110 may present a different user experience to a user. For example, client device 110A may be a first screen device with features facilitating easy interaction and/or engagement of a user with presented content. For example, client device 110A may be a mobile device, such as a smartphone, tablet or laptop, including touchscreen navigation and/or a virtual keyboard, a desktop computer including a cursor control device (e.g., mouse) and keyboard, etc. Client device 110B may be a second screen device (including a device coupled to a screen, such as a gaming console) with features facilitating convenient content consumption, e.g., client device 110B may be a smart television with a communication application 115B installed, a television plug-in, a digital media streaming device, a gaming console, or the like. As an example case, client device 110A may be a smartphone with mobile application 115A that provides a user interface 116A including content viewer 113A and interaction component 114A, and client device 110B may be a television (e.g., smart TV) with TV application 116B (e.g., an application adapted for use by a smart TV, a media streaming device, etc.) that provides a user interface 116B including content viewer 113B and interaction component 114B. One device (e.g., client device 110B) may provide a more convenient content consumption experience, while another device (e.g., client device 110A) may provide a richer environment for deeper interactions with the content, e.g., viewing and adding comments, liking and sharing comments, liking and sharing media content, participating in live chat, performing transactions, etc.

In some embodiments, server machine 106 includes a content engagement manager 150 that initiates pairing of multiple client devices to facilitating user participation in content engagement activities on one of the client devices with respect to the content presented on another of the client devices. In particular, content engagement manager 150 may instruct client device 110A and client device 110B to form a communication link with bidirectional communication server 107. For example, a communication link may be established between client device 110A and client device 110B such that the first device becomes paired to the second device. In some embodiments, the communication link may allow user requests input via one device to affect actions performed by the other device. For example, a first client device (e.g., client device 110A) may provide access to media control (e.g., play/pause, skip, media queue, etc.) while a second client device (e.g., client device 110B) displays the media content, including modifying presentation of the media based on the input received by a user via the first client device 110A.

In some embodiments, a connection may be established between two client devices. A connection between devices may facilitate a richer user experience for interacting with content (e.g., content items 121). For example, content may be viewed on a device (e.g., client device 110B) optimized for content consumption (e.g., videos may be viewed on a television via an app, via a streaming media device, via a gaming console, etc.). Client device 110B may communicate with a server (e.g., content engagement manager 150 of server machine 106) and identify that content is being presented by client device 110B. In some embodiments, the server machine 106 may store data indicative of the communication received from client device 110B such as an identifier of a user account. Client device 110B may cause additional data to be stored by server machine 106 (e.g., by sending this data to server machine 106). The additional data may include, for example, an indication of what content item 121 is being presented, an indication of a network client device 110B is connected to, an indication of physical location of client device 110B (e.g., via location services), or the like. In some embodiments, client device 110B may direct a user to open communication application 115A on client device 110A (e.g., via user interface 116B of client device 110B). In some embodiments, client device 110A may send a request to content platform system 102 (e.g., content engagement manager 150 of server machine 106). The request may include a request for information regarding media being presented by another device. The request may be sent by client device 110A responsive to one or more triggers, e.g., on opening communication application 115A, on activating application 115A from the background, on interaction by the user (e.g., via a connection request UI element), along with other request (e.g., search requests, video view requests, etc.), or the like. In some embodiments, content engagement manager 150 may determine if there is an indication that the user may be interested in or benefit from connecting client device 110A and client device 110B, e.g., content platform system 102 may check memory (e.g., stored in data store 140, associated with server machine 106, etc.) for an indication that connection between devices may benefit or be of interest to the user. For example, data read may include data indicating one or more similarities between the devices (e.g., it may be more likely that a user would want to connect devices signed in to the same user account, devices connected to the same network, devices in nearby locations, etc.), one or more past actions (e.g., past history with connecting these devices, past history of the user associated with connecting these or other devices, past history of the user dismissing prompts to connect devices, etc.), or the like. In some embodiments, a determination may be made (e.g., by content engagement manager 150 of server machine 106) whether or not it is likely that the user would be interested in or benefit from connecting the devices. In some embodiments, a prompt may be displayed on client device 110A (e.g., via user interface 116A of communication application 115A) to connect the devices. In some embodiments, the prompt may be displayed responsive to determining, by content engagement manager 150, that both devices are associated with the same user account (e.g., applications of both devices are signed in to the same user account). An example prompt is discussed in connection with FIG. 2A. In some embodiments, the prompt may provide a mechanism of confirming that the same user is associated with both devices, for example, a UI element may be displayed on the second screen device including a code, and the prompt displayed on the first screen device may include a field to enter the code.

In some embodiments, a user may indicate a feature they would like to interact with on one client device, and may utilize the feature as presented on another client device. For example, a user may be viewing content (e.g., a video) on client device 110B (e.g., a television, a television-connected device, etc.). Client device 110B may be preferred by the user for viewing content but may not be optimized for further interaction (e.g., typing a comment or typing a username to share content may be cumbersome on a remote controller, a gaming console controller, or the like). In some embodiments, user interface 116B of client device 110B may display an option to interact with a feature associated with displayed content, e.g., an option to interact with a comments section or a live chat associated with a video, an option to perform a transaction associated with the video (e.g., subscribe to a channel associated with the video, donate to a content provider or an associated charity, purchase a product via an affiliate link, etc.), or the like. In some embodiments, user interface 116B may prompt the user to access the interactive content utilizing another device, e.g., client device 110A. In some embodiments, client device 110B may provide (e.g., for storage by server machine 106) an indication of the request by the user to access the content. The user may interact with client device 110A, e.g., by opening communication application 115A, by activating communication application 115A from the background, by interacting with a UI element of communication application 115A, etc. Client device 110A may send a request to content platform system 102 for information associated with content displayed on another device. Content platform system 102 may send to client device 110A a message including information indicating that the user wishes to view interactive content, as received via user interface 116B of client device 110B. Client device 110A may display a prompt (e.g., via user interface 116A) offering the user to connect the devices, to view the requested interactive content, etc.

In some embodiments, communication applications 115 installed on client devices 110 may be associated with a user account, e.g., a user may be signed in to an account on the client device 110. In some embodiments, multiple client devices 110 may be associated with the same client account. In some embodiments, generating a communication link between client devices (e.g., via bidirectional communication server 107) may be performed responsive to the client devices being associated with the same user account.

In some embodiments, client devices 110 may include one or more data stores. Data stores may include commands (e.g., instructions, which cause operations when executed by a processing device) to render a UI (e.g., user interfaces 116). The instructions may include commands to render a content component and an interaction component.

In some embodiments, the one or more server machines 106 may include computing devices such as rackmount servers, router computers, server computers, personal computers, mainframe computers, laptop computers, tablet computers, desktop computers, etc., and may be coupled to one or more networks 105. Server machines 106 may be independent devices or part of any of the platforms (e.g., content providing platform 120, social network platform 160, etc.).

Social network platform 160 may provide an online social networking service. The social networking platform 160 may provide a communication application 115 for users to create profiles and perform activities with their profiles. Activities may include updating the profile, exchange messages with other users, evaluating (e.g., like, comment, share, recommend) status updates, photos, videos, etc., and receiving notifications associated with other users' activity.

Recommendation platform 157 may be used to generate and provide content recommendations (e.g., articles, videos, posts, news, games, etc.). Recommendations may be based on search history, content consumption history, followed/subscribed channel content, linked profiles (e.g., friend lists), popular content, etc. Search platform 145 may be used to allow users to query the one or more data stores 140 and/or one or more platforms and receive query results. Advertisement platform 165 may be used to provide video advertisements.

Content providing platform 120 may be used to provide one or more users with access to content items 121 and/or provide the content items 121 to one or more users. For example, content providing platform 120 may allow users to consume, upload, download, and/or search for content items 121. In another example, the content providing platform 120 may allow users to evaluate content items 121, such as approve of ("like"), disapprove of, recommend, share, rate, and/or comment on content items 121. In another example, the content providing platform 120 may allow users to edit content items 121. The content providing platform 120 may also include a website (e.g., one or more webpages) and/or one or more applications (e.g., communication applications 115) that may be used to provide one or more users with access to the content items 121. For example, communication application 115A may be used by client device 110A to access content items 121. Content providing platform 120 may include any type of content delivery network providing access to content items 121.

Content providing platform 120 may include multiple channels (e.g., channel A 125, channel B 126, etc.). A channel may be a collection of content available from a common source, a collection of content having a common topic or theme, etc. The data content may be digital content chosen by a user, digital content made available by a user, digital content uploaded by a user, digital content chosen by a content provider, digital content chosen by a broadcaster, etc. For example, channel A 125 may include two videos (e.g., content items 121A-B). A channel may be associated with an owner, who may be a user that can perform actions on the channel. The content may be one or more content items 121. The data content of the channels may be prerecorded content, live content, etc. although channels are described as one implementation of a content providing platform, implementations of the disclosure are not limited to content sharing platforms that provide content items 121 via a channel model.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline, such as a topic channel, of one or more platforms, one or more content items, etc.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 2A:
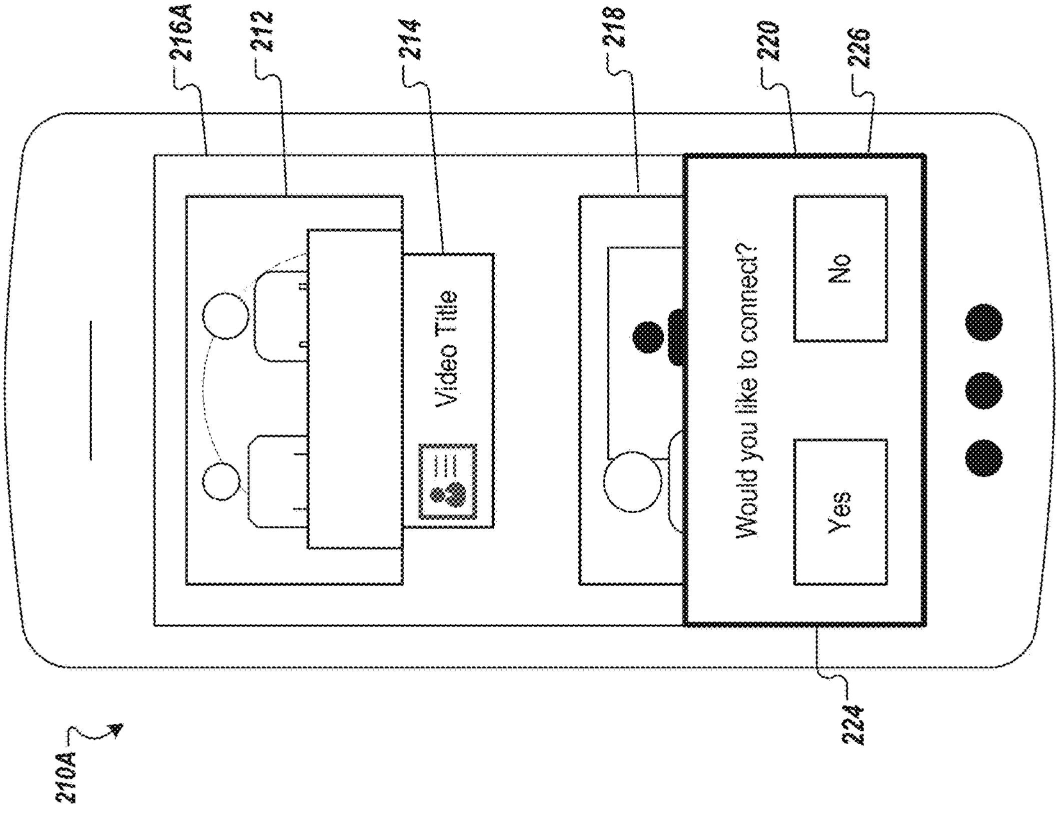
FIG. 2A is an example graphical user interface (GUI) of a communication application of a client device, including a prompt for a user, according to some embodiments.

FIG. 2A is an example graphical user interface (GUI) of a communication application 216A of a client device 210A (e.g., communication application UI 116A of client device 110A of FIG. 1), including a prompt for a user, according to some embodiments. In some embodiments, client device 210A may receive an indication (e.g., from server machines 106) that a prompt 220 is to be displayed for a user. In some embodiments, client device 210A may display prompt 220 responsive to receiving a response to a request sent by client device 210A via a network, e.g., to content platform system 102 of FIG. 1. In some embodiments, prompt 220 may be displayed to a user responsive to a determination (e.g., by server machine 106) that a user may benefit by connecting two or more devices.

UI 116A may include one or more UI elements. In some embodiments, prompt 220 may replace rendered components in a portion of screen space of device 210A that may include other UI elements, e.g., prompt 220 may appear "on top" of (e.g., overlaying portions of) UI 216A in a transparent, semi-transparent or non-transparent form. Example UI 116A includes first content item indicator 212 (e.g., a video thumbnail, a UI element to present a content item, etc.), first content item information 214 (e.g., title, description, etc.), and second content item indicator 218 (e.g., a second video thumbnail). Any other appropriate UI elements may be included in UI 116A, e.g., additional interactive components (e.g., comments, like button, affiliated product links, donation links, etc.), additional social components, additional control components (e.g., UI elements to access a user profile, settings, or the like), etc.

Prompt 220 may include query 222, accept UI element 224, and reject UI element 226. Query 222 may be text based, visual, graphical, etc. Query 222 may provide information associated with a pending connection request to a user. Query 222 may include additional information displayed to the user, e.g., an identifier of the device to be connected (e.g., an address of the device, a user-selected device name, etc.), an identifier of a network associated with the device to be connected, an identifier of a user account associated with the device to be connected, information associated with content item displayed on the device to be connected (e.g., content item title, thumbnail, etc.), a field for entering a code or password, or the like. Accept UI element 224 and/or reject UI element 226 can be, for example, a button, an icon, a checkbox, a dropdown list, etc.

Upon a user interacting with (e.g., activating or selecting) accept element 224, a connection between client device 210A and another device may be generated. As an example, the other client device may be a device displaying a content item, e.g., a television, a digital media streaming device, a gaming console, etc. A first connection may be generated between a bidirectional communication server and client device 210A responsive to interaction with accept element 224, and a second connection may be generated between the bidirectional communication server and the client device to be connected to device 210A. The two client devices may then communicate, e.g., information may be passed regularly, periodically, upon user interaction, etc., between the two devices. An exemplary UI associated with connected devices is discussed in connection with FIG. 2B. In some embodiments, data associated with the accepted connection may be saved, e.g., by server machine 106. Data associated with the accepted connection may include identifiers of the devices connected, contextual identifiers (e.g., time of day, content displayed during connection, etc.), user account identifiers, etc. Data may be saved, for example, via server machines 106.

Upon a user interacting with reject element 226, a pending connection between client device 210A and another device may be terminated. In some embodiments, data associated with the rejected connection may be saved, e.g., by server machines 106 of FIG. 1. In some embodiments, presentation of prompt 220 to a user may be performed in view of previous connection activity, e.g., in view of previous user interactions with connection prompts, interactions with connection prompt accept elements, interactions with connection prompt reject elements, etc.

In some embodiments, prompt 220 may be directed to a specific action. In some embodiments, a particular engagement option may be selected by a user on a second device (e.g., a device other than client device 210A, such as a television associated with the same user account as client device 210A). For example, the second device may be displaying a content item to a user, and the user may navigate utilizing a UI of the second device to a particular engagement prompt (such as a comment section). In some embodiments, a signal may be sent to client device 110A indicative of the user selection. Prompt 220 may reflect the user selection, e.g., query 222 may ask if a user would like to utilize client device 210A for reading/contributing to a comment section associated with the content presented via the second device. Prompt 220 may also include any other information discussed above, such as user ID, information associated with the device to be connected, information associated with a content item presented by the device to be connected, etc.

Figure 2B:
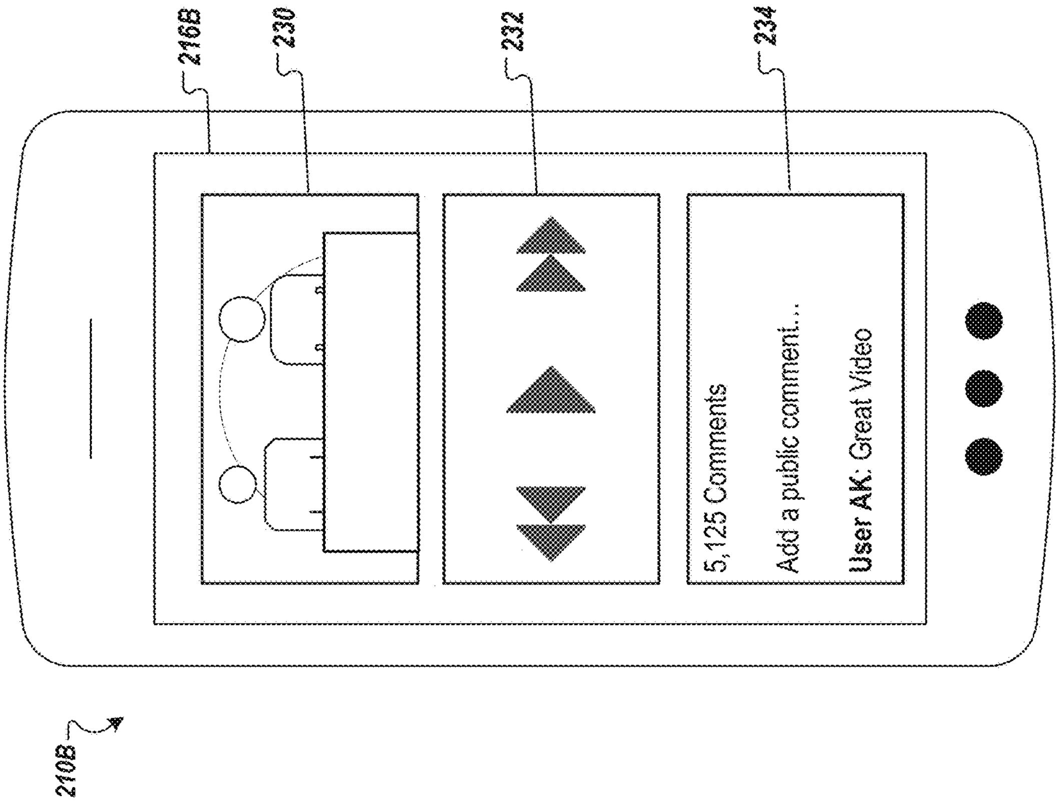
FIG. 2B depicts an example communication application GUI of a client device while connected to a second device, according to some embodiments.

FIG. 2B depicts an example communication application graphical user interfaces (GUI) 216B of client device 210B (e.g., UI 116A or client device 110A of FIG. 1) while connected to a second device, according to some embodiments. UI 216B may include content item element 230, content delivery control element 232, and content engagement element 234. The arrangement and functions of these elements may be performed by more or fewer UI elements, and more or fewer functions may be provided by UI 216B. Functions described herein as associated with one UI element may be carried out by another UI element and still be within the scope of this disclosure.

Content item element 230 may include an indication of content being displayed on one or more linked devices (e.g., multiple screens in multiple rooms may display content on devices connected to client device 210B). Content item element 230 may include a thumbnail, preview, title, associated information (e.g., channel owner name, topic or theme, playlist name, etc.), etc. Content delivery control element 232 may include playback control (e.g., play/pause, skip, etc.), as well as other content delivery control elements, such as a watch queue, a search function, etc. Content delivery control element 232 may be utilized to adjust presentation of content on another device, e.g., a smart TV.

Content engagement element 234 may include one or more sub-elements facilitating engagement with one or more content items. For example, content engagement element 234 may include sub-elements associated with a comment section associated with a content item, a channel subscription option, other transaction options, feedback/content evaluation options (e.g., like/dislike button), etc. In some embodiments, content engagement element 234 may include one or more sub-elements (e.g., in the form of buttons, icons, checkboxes, dropdown lists, text fields, etc.) that allow engagement with a corresponding engagement mechanisms, e.g., a user may select comments, feedback options, etc., then UI 216B may display a view configured to facilitate engagement in the selected mechanism (e.g., may display a comment section of a live chat window full screen). In some embodiments, a type of content engagement may be selected on a different device (e.g., a screen device associated with the same user account as client device 210B), and the content engagement element 234 may navigate to the selected engagement mechanism responsive to the selection on the other device.

Figure 2C:
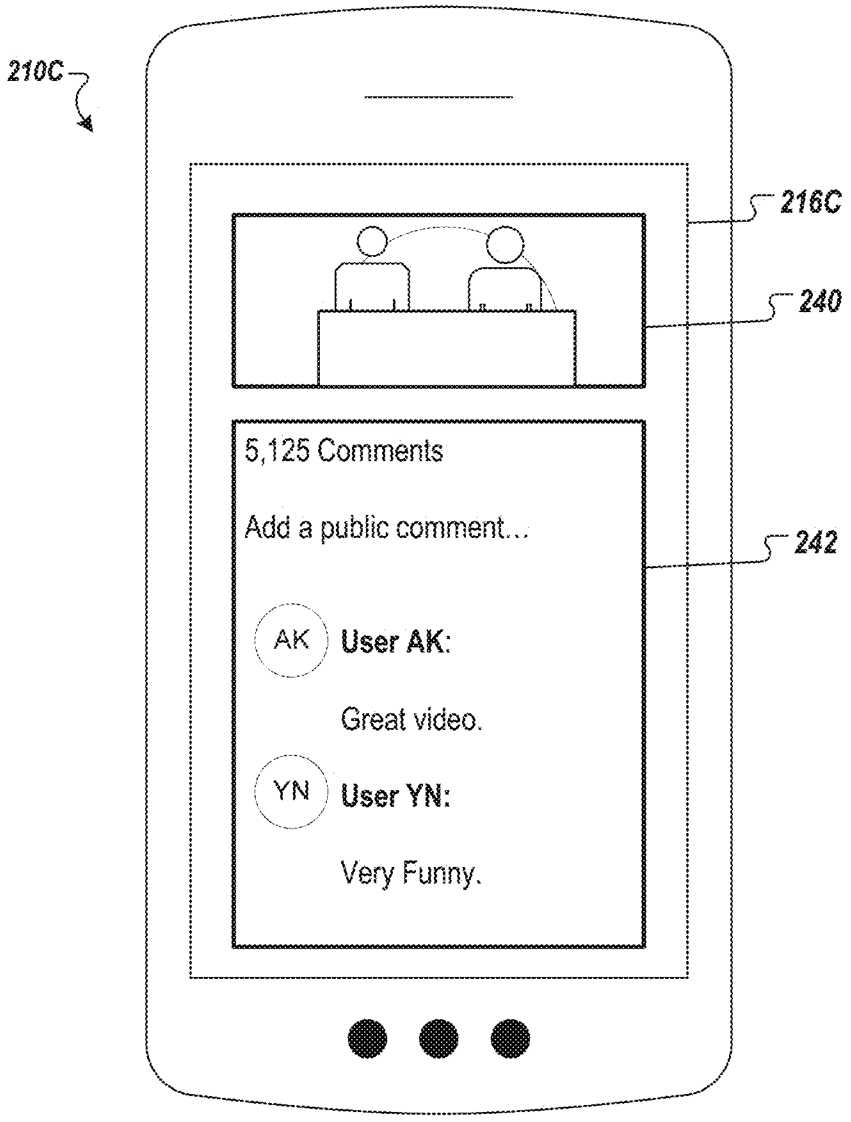
FIG. 2C depicts an example GUI of a client device, including an extend content engagement element, according to some embodiments.

FIG. 2C depicts an example UI 216C of client device 210C (e.g., UI 116A of client device 110A of FIG. 1), including an extended content engagement element 242, according to some embodiments. UI 216C includes content item element 240 and content engagement element 242. In some embodiments, UI 216C may be displayed by client device 210C while client device 210C is paired (e.g., connected) to a second client device. Content item element 240 may provide one or more indications of a content item being presented, e.g., on a second paired device. Content item element 240 may include content item title, an image (e.g., thumbnail) associated with the content item, etc. Content engagement element 242 may display an interface for further engagement with content (e.g., associated with content item element 240). For example, content engagement element 242 may present a comment section, content description, a live chat, one or more transaction options, or the like. In some embodiments, the content engagement item displayed via content engagement element 242 may be selected responsive to a user input. A user may indicate, e.g., via content engagement element 234 of FIG. 2B, the user's intention to engage in a particular engagement option. That option (e.g., a comment section, a live chat, etc.) may be displayed in an extended content engagement element 242. In some embodiments, a user may indicate the user's intention to engage in an engagement option via a UI displayed on a second device (e.g., a client device paired to client device 210C). Selection of engagement option via a UI on a second device is discussed in more detail in connections with FIGS. 3A-B.

Figure 3A:
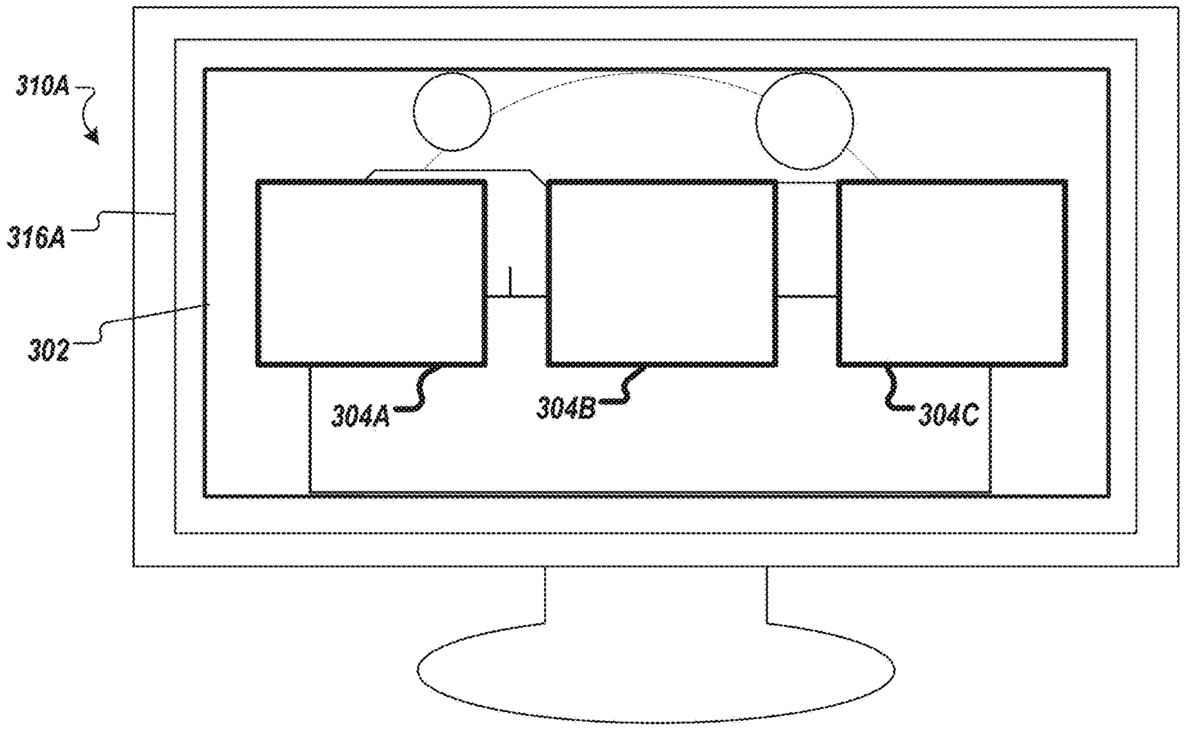
FIG. 3A depicts an example GUI of a client device, including selectable elements for customizing content engagement on a second device, according to some embodiments.

FIG. 3A depicts an example UI 316A of client device 310A (e.g., UI 116B of client device 110B of FIG. 1), including selectable elements for customizing content engagement on a second device, according to some embodiments. UI 316A may include a content display element 302. Content display element 302 may be configured to provide (e.g., present or play) a content item (e.g., content items 121 of FIG. 1), e.g., photos, videos, etc. UI 316A may include engagement elements 304A-C (e.g., buttons, icons, checkboxes, fields, etc.). For example, engagement element 304A may provide an option to engage with comments associated with content displayed via content display element 302. Engagement element 304B may provide an option to engage with social network operations associated with the content (e.g., share a video, post a video to a user profile, etc.). Engagement element 304C may provide options for performing transactions (e.g., pay to subscribe to a content channel, donate to an organization associated with the content, etc.), etc. Alternate engagement elements may include live chat, video description, related videos/playlists, etc. In some embodiments, the number and/or arrangement of engagement elements may be different than displayed in FIG. 3A.

In some embodiments, content engagement elements 304 may be displayed overlayed with content display element 302, e.g., upon receiving a signal from a control device (e.g., a television remote control), one or more options for engagement may be displayed on top of the content being presented by client device 310A (e.g., as overlay UI elements in transparent, semi-transparent or non-transparent form). In some embodiments, content engagement elements 304 may be displayed in a different arrangement, e.g., content display element may be reduced in size and content engagement elements 304 may be displayed in a different portion of the screen of client device 310A, the display of client device 310A may be updated to show content engagement elements 304 and not display element 302 (e.g., the UI 316A may scroll content display element 302 off-screen to display content engagement elements 304), etc.

In some embodiments, a user may navigate to and/or select one of the engagement elements 304 of UI 316A, e.g., utilizing arrow keys on a television remote, utilizing an analog stick of a gaming console controller, etc. Upon selecting an engagement element, a prompt may be displayed on UI 316A instructing a user to access an application installed on another device, e.g., client device 110A of FIG. 1. In some embodiments, client device 310A provides (e.g., for storage by server machine 106) data indicative of a user selection (e.g., of engagement element 304A). A signal indicative of the stored data may be transmitted to another client device to facilitate engagement in the selected content, e.g., upon opening an application on the other client device, server machine 106 may be queried by the other client device for data associated with a user selection, and the client device may display a prompt in a UI requesting the user connect the two devices, use the second device to engage with the selected content, etc. In some embodiments, a prompt to connect devices may be provided without the user selecting an engagement option. In some embodiments, a prompt to connect devices may be updated to a prompt to participate in a content engagement activity (e.g., with text such as "Connect your devices to view comments?", "Connect your devices to share with friends?", "Connect your devices to subscribe to the channel?", etc.) based on a user selection via UI 316A. In some embodiments, the devices may be connected without displaying a prompt on the second client device, e.g., responsive to user selection of an engagement element and user interaction with the second device (e.g., opening an application associated with the content on the second device), a connection between the devices may be generated.

Figure 3B:
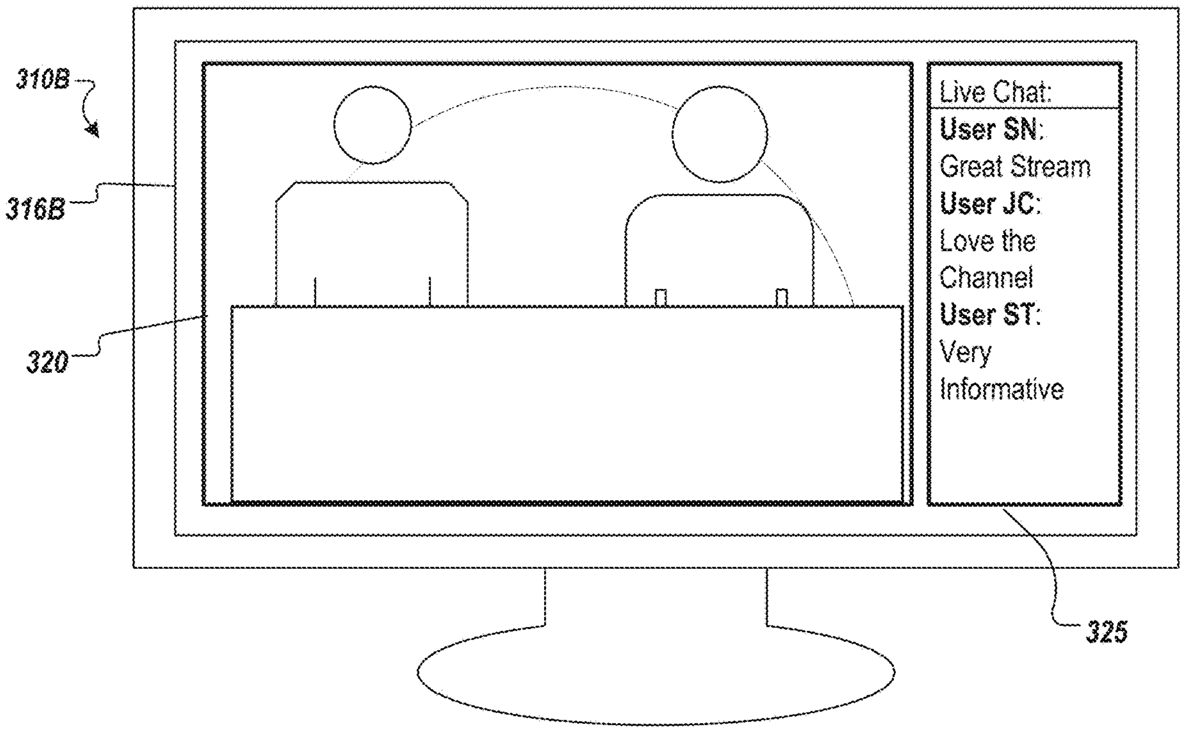
FIG. 3B depicts an example GUI of a client device with an on-screen engagement element associated with a presented content item, according to some embodiments.

FIG. 3B depicts an example UI 316B of a client device 310B (e.g., UI 116A of client device 110A of FIG. 1), with an on-screen engagement element associated with a presented content item, according to some embodiments. UI 316B may include content display element 320 for presenting content (e.g., a video) to a user. UI 316B may further include an engagement element 325, which may display additional information to the user. The application of client device 310B associated with UI 316B may determine the type of view to present to the user (e.g., arrangement of elements, included elements, etc.) based on the type of content, selection of the user, selection of a content provider (e.g., channel owner), types of engagement available for the content, or the like. For example, content display element 320 may display a live-streamed video. Engagement element 325 may display a live chat associated with the live-streamed video.

In some embodiments, client device 310B may be configured for viewing content, e.g., client device 310B may be a television in a user's home. Devices configured for viewing content may not be efficient tools for further engagement with the content—e.g., typing to interact with a live chat or comments using a television remote may be cumbersome. Devices configured for convenient interaction (e.g., devices with a physical or virtual keyboard) may not be a preferred device for displaying and/or viewing content—e.g., a user may prefer to watch a video on a television rather than a mobile phone.

In some embodiments, a user may, utilizing UI 316B of client device 310B, select engagement element 325. For example, a user may use a television remote, a gaming console remote, etc., to select a live chat accompanying a live-streamed video. Responsive to the user selection of engagement element 325, client device 310B may facilitate user engagement in the selected mode of engagement (e.g., the mode displayed via engagement element 325, such as a live chat) via a second client device. Client device 310B may cause a prompt to be displayed on the second client device to connect the two devices. Client device 310B may cause a prompt to be displayed on the second client device to engage in the selected mode of engagement (e.g., "Connect your devices to participate in live chat?"). Client device 310B may display, via UI 316B, instructions for the user. For example, client device 310B may display instructions for the user to open an application on the second client device. Client device 310B may cause data to be stored in a server responsive to the user selection of the engagement element. The stored data may include, for example, a user account identifier, an identifier of the content displayed by client device 310B, an identifier of the user-selected engagement method, etc. The second client device may send a request to a server for data associated with client device 310B (e.g., responsive to a user opening an application on the second client device). The second client device may receive data indicating a request to connect devices, a request to display an engagement element, etc., and device pairing operations may commence. In some embodiments, the devices may be connected without displaying a prompt on the second client device. For example, upon a user selecting engagement element 325, client device 310B may display an instruction for the user to open an application associated with the presented content on the second device. Responsive to the user opening the application, the devices may generate a connection, e.g., device pairing operations may commence. Device pairing operations may include ensuring that the two devices are associated with the same user account, sending and receiving messages indicative of the presented content and/or device connection history, etc.

Figure 4A:
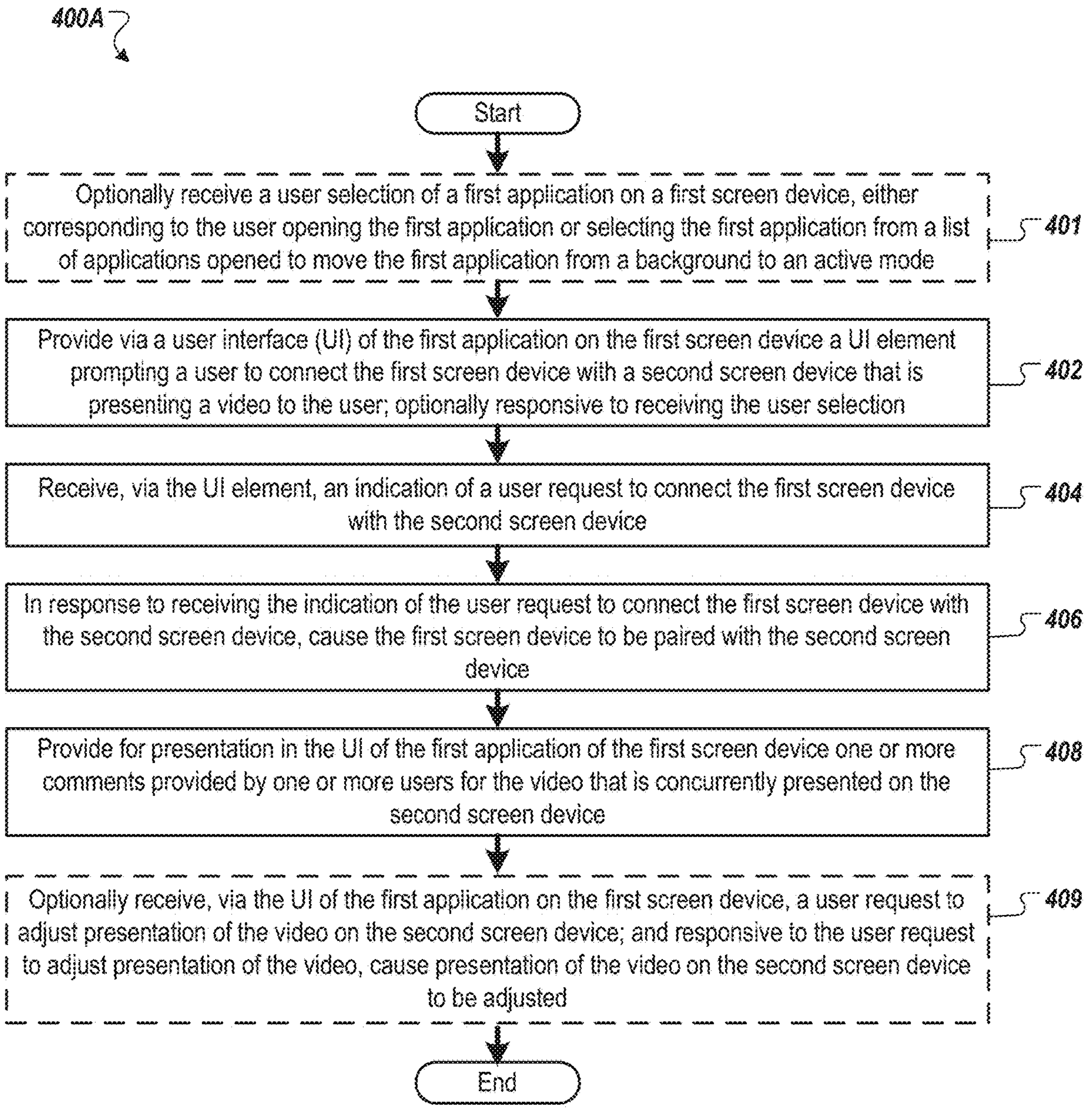
FIG. 4A depicts a flow diagram of a method for facilitating user engagement associated with a content item, according to some embodiments.

FIG. 4A depicts a flow diagram of a method 400A for facilitating user engagement associated with a content item, according to some embodiments. The method 400A is performed by processing logic that may comprise hardware (circuitry, dedicated logic, etc.), software (such as is run on a general purpose computer system or a dedicated machine), or a combination of both. In one implementation, the method is performed by server 106 (e.g., content engagement manager 150) of FIG. 1, while in some other implementations one or more blocks of FIG. 4A may be performed by communication application 115A and/or communication application 115B of FIG. 1.

Reference throughout FIG. 4A and the associated description is made to a video. Analogous methods may be applied for various other types of content items (e.g., image content, audio content, etc.), with a video being used as an exemplary embodiment for clarity. At block 401, processing logic may optionally receive a user selection associated with a first application on a first screen device. The user selection may correspond to the user opening the first application or selecting the first application from a list of open applications to move the first application from a background mode to an active mode. At block 402, processing logic provides a UI element prompting a user to connect a first screen device with a second screen device. The UI element is presented via a UI of a first application of the first screen device. The second screen device is presenting a video to the user via a second application. In some embodiments, the first and second applications are related applications that are each associated with (and managed by) a content platform, provide some overlapping features and are designed to support different types of user devices (e.g., mobile phone type and TV type).

In some embodiments, providing the UI element prompting the user to connect the screen devices (e.g., devices integrated with a screen, such as a smart television, smart phone, tablet, etc., devices output to a screen, for display, such as a personal computer, gaming console, digital media streaming device, etc., or the like) may be performed responsive to detecting a user action. The user action may be with respect to the first application. The user action may be an action that causes the first screen device to communicate with a server associated with the first application, for example, opening the application, selecting the application from a list of open applications to move the application from a background mode to an active mode, searching for or selecting a content item using the first application, selecting a content engagement option using the first application, or the like. In response to the detected user action, providing the UI element may further be performed responsive to determining whether a second application on the second screen device is associated with the first user account. Providing the UI element may further include causing the UI element prompting the user to connect the two screen devices to be presented on the UI of the first application.

In some embodiments, previous interactions of the user with UI elements prompting the user to connect devices may be utilized in determining whether to provide the UI element prompting the user to connect the first screen device to the second screen device. For example, a UI element prompting a user to connect two screen devices may have been previously rejected by the user (e.g., as identified by the user account associated with one or more applications). In some embodiments, a prompt may not be provided to the user in view of the rejection. In some embodiments, a prompt may not be provided to the user until a threshold duration has passed, a threshold number of opportunities that may trigger presentation of the UI element have passed, or the like. In some embodiments, only one prompt to connect devices (e.g., a UI element displaying a prompt) is allowed to be provided to the user per watch session. For example, the second screen device may cause data to be stored identifying the current watch session. For example, the current watch session may be assigned a unique watch session identifier. The watch session may be associated with opening the second application, selecting content to present, selecting a playlist of content to present, or the like. The first device may only provide the UI element prompting the user to connect once per watch session, as recorded by the watch session identifier (e.g., the first device may be provided with the watch session identifier and determine if a prompt was previously provided during the watch session associated with the identifier, a server may determine whether to send instructions to the first device responsive to the watch session identifier, etc.).

At block 404, processing logic receives, via the UI element, an indication of a user request to connect the first screen device with the second screen device. In some embodiments, the UI element may present to a user elements for interaction, e.g., a "connect" button and a "don't connect" button. In some embodiments, the UI element may be displayed via the first application of the first screen device.

At block 406, processing logic causes the first screen device to be paired with the second screen device. The pairing is performed responsive to receiving the indication of the user request to connect the first screen device with the second screen device. In some embodiments, pairing the first screen device to the second screen device may include generating a first connection between the first screen device and a server (e.g., bidirectional communication server 107 of FIG. 1), and generating a second connection between the second screen device and the server. The connections with the bidirectional communication server may enable messages to be passed back and forth between the two screen devices. In some embodiments, one device may influence actions performed by the other device. For example, the first screen device may be provided with a UI element to alter playback of a video (e.g., pause, skip, queue next, etc.) presented on the second screen device. As another example, the second screen device may be used to select an engagement option which is then displayed on the UI of the first screen device.

At block 408, processing logic provides for presentation in the UI of the first application of the first screen device one or more comments provided by one or more users for the video that is concurrently presented on the second screen device. Processing logic may identify one or more comments provided by users (e.g., by querying a server associated with the video) for display. In some embodiments, the UI of the first application may provide a field for receiving user input. For example, the UI of the first application may provide a field for a user to type their own comment associated with the video displayed on the second screen device. In some embodiments, the first UI may present a mechanism for providing feedback about the presented content item (e.g., a "like" and/or "dislike" button). In some embodiments, the feedback mechanism may express user approval or disapproval. In some embodiments, the UI of the first application may present a mechanism for providing feedback related to a comment associated with the presented content item, e.g., a mechanism for the user to indicate approval or disapproval of a comment, set of comments, or the like. An indication of the user interaction (e.g., the comment, the feedback, or the like) may be displayed on the first screen device and/or the second screen device. For example, a user may enter a comment on a mobile device for a video presented on a smart TV, and the comment may become visible in a comments section displayed on the smart TV. At block 409, processing logic optionally receives, via the UI of the first application on the first screen device, a user request to adjust presentation of the video on the second screen device. Responsive to receiving the user request, processing logic may cause presentation of the video on the second screen device to be adjusted.

In some embodiments, one or more of the devices utilized in methods analogous to methods 400A-E may not be a screen device. For example, a device analogous to the second screen device of method 400A may be an audio device, such as an internet-connected speaker, an internet of things device, etc. The second audio device may present audio content, e.g., a podcast, an audio book, a radio show, or the like. Responsive to a user being presented with the audio content via the second audio device, a prompt may be presented to the user via a first device to connect the two devices, to participate in engagement mechanisms associated with the presented content, or the like. For example, the first device may be a smart phone, and user participation in a comments section associated with the presented audio content may be facilitated by utilizing a smart phone's virtual keyboard.

Figure 4B:
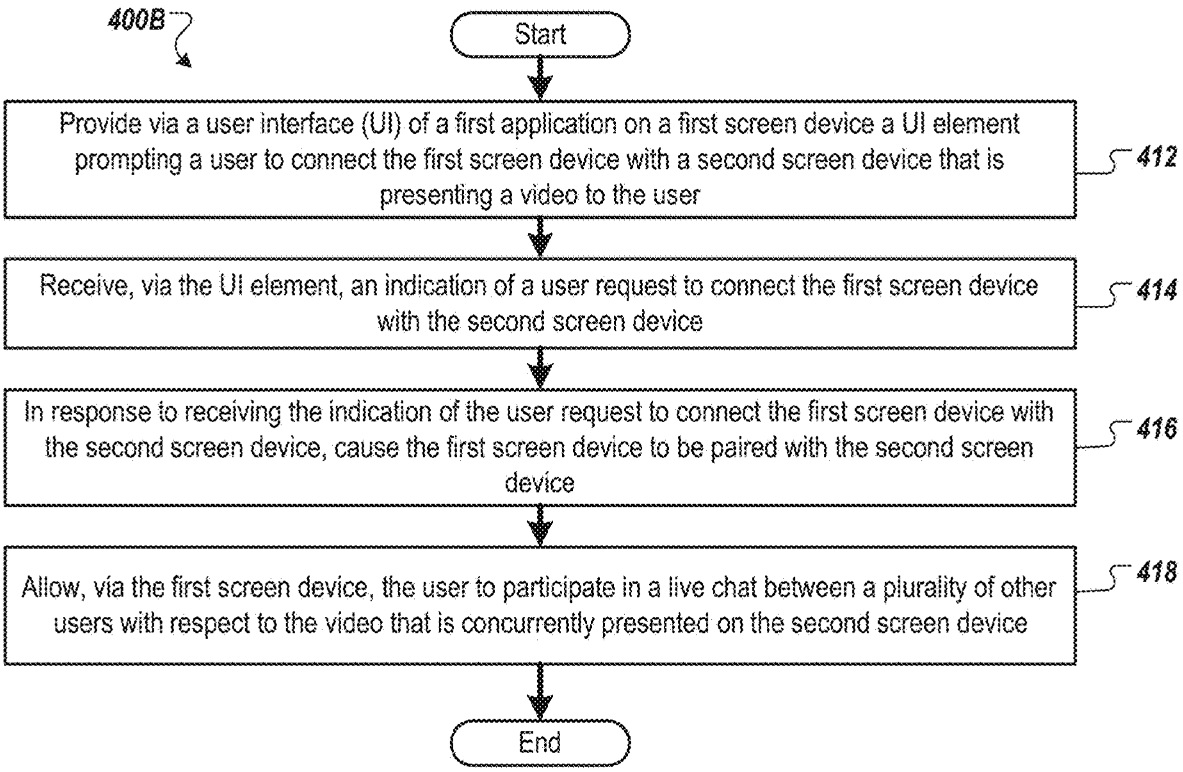
FIG. 4B depicts a flow diagram of a method for facilitating user engagement with a live chat associated with a content item, according to some embodiments.

FIG. 4B depicts a flow diagram of a method 400B for facilitating user engagement with a live chat associated with a content item, according to some embodiments. The method 400B is performed by processing logic that may comprise hardware (circuitry, dedicated logic, etc.), software (such as is run on a general purpose computer system or a dedicated machine), or a combination of both. In one implementation, the method is performed by server 106 (e.g., content engagement manager 150) of FIG. 1, while in some other implementations one or more blocks of FIG. 4B may be performed by communication application 115A and/or communication application 115B of FIG. 1.

At block 412, processing logic provides via a UI of a first application on a first screen device a UI element prompting a user to connect the first screen device with a second screen device that is presenting a video to the user. Operations associated with method 400B make specific reference to a video, a screen device, etc. One skilled in the art to which this method pertains will recognize that in some embodiments, devices may be utilized for analogous methods that are not screen devices, e.g., audio devices. One skilled in the art to which this method pertains will recognize that in some embodiments, a different type of content item (e.g., audio media, image media, etc.) may be presented to a user. Operations of block 412 may share features with operations of block 402 of FIG. 4A. In some embodiments, the video presented may be live-streamed, e.g., comprise live video content.

In some embodiments, the second screen device may cause data to be saved associated with the presentation of the content item (e.g., video). The second screen device may cause data to be saved on a server, e.g., a server associated with (e.g., accessible by) the first application of the first screen device and/or the second application of the second screen device. The data saved may include, for example, an indication of the content presented, an indication of a user account associated with the second application, an identifier of the current watch session, etc. The UI element may be presented on the first screen device responsive to the first screen device sending a request to the server, and the first screen device receiving from the server an indication of data caused to be stored by the second screen device. In some embodiments, presentation of the UI element to the user may be performed responsive to a history of user interaction with other UI prompts, e.g., a user that has recently (e.g., within a threshold time period) rejected a prompt to connect may not be presented with the UI element prompting the user to connect the first screen device to the second screen device.

At block 414, processing logic receives, via the UI element, an indication of a user request to connect the first screen device with the second screen device. Operations of block 414 may have features in common with block 404 of FIG. 4A. At block 416, processing logic, in response to receiving the indication of the user request to connect the first screen device with the second screen device, causes the first screen device to be paired with the second screen device. Operations of block 416 may have features in common with block 406 of FIG. 4A. Causing the first screen device to be paired to the second screen device may include connecting the first screen device and the second screen device to a bidirectional communication server. Processing logic may further identify one or more live chats associated with the content (e.g., live-streamed video) presented on the second screen device. A live chat may refer to messages provided and read by one or more users, including updating the display of the chat to incorporate newly added messages. A live chat may be associated with live content, e.g., a content creator may be streaming video of the creator performing an activity, and the live chat may offer users a means to interact with the creator, with each other, etc., while consuming the content. A live chat may be associated with pre-recorded content, e.g., pre-recorded content may be presented at a scheduled time, and the live chat may provide users, the creator, etc., a means of discussing the presented content, interacting with each other, etc.

At block 418, processing logic allows the user to participate in a live chat between a plurality of other users with respect to the video that is concurrently presented on the second screen device. The live chat interaction element may be presented via the first UI of the first screen device. Operations of block 418 may share features with operations of block 408 of FIG. 4A. The user may be provided with an updating record of messages provided to the live chat by other users. The user may be provided with a method (e.g., a virtual keyboard) for providing one or more messages to the live chat. Messages provided by the user as part of the live chat may be displayed on the first screen device and/or the second screen device.

Figure 4C:
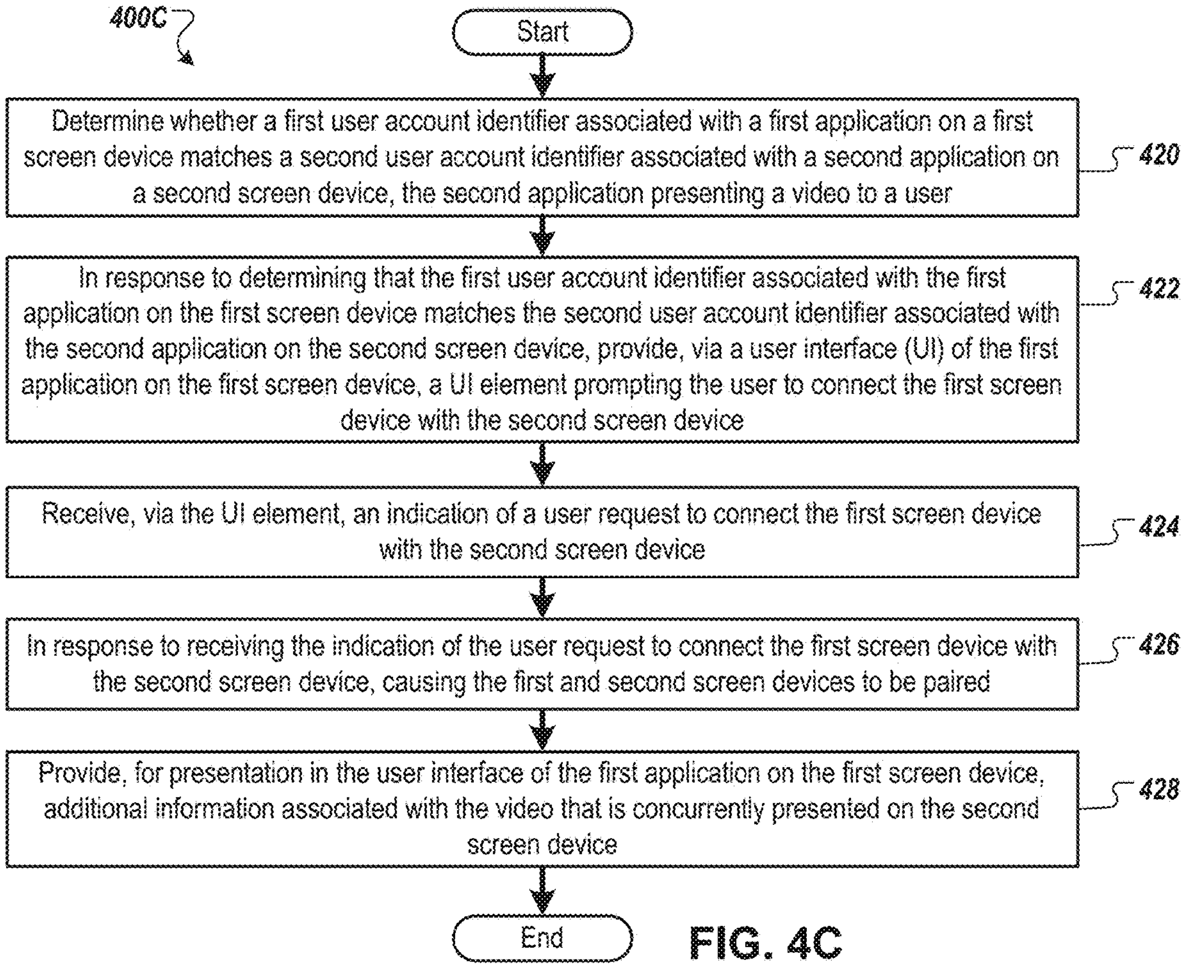
FIG. 4C depicts a flow diagram of a method for facilitating user engagement associated with a content item presented by a device associated with an account of the user, according to some embodiments.

FIG. 4C depicts a flow diagram of a method 400C for facilitating user engagement associated with a content item presented by a device associated with an account of the user, according to some embodiments. The method 400C is performed by processing logic that may comprise hardware (circuitry, dedicated logic, etc.), software (such as is run on a general purpose computer system or a dedicated machine), or a combination of both. In one implementation, the method is performed by server 106 (e.g., content engagement manager 150) of FIG. 1, while in some other implementations one or more blocks of FIG. 4C may be performed by communication application 115A and/or communication application 115B of FIG. 1.

At block 420, processing logic determines whether a first user account identifier associated with a first application on a first screen device matches a second user account identifier associated with a second application on a second screen device. The second application is presenting a video to a user. In some embodiments, another type of device (e.g., an audio device presenting audio content) or another type of content (e.g., audio content, image content, text content, etc.) may be associated with an analogous method to method 400C.

Determining the first user account identifier matches the second user account identifier may include receiving, from the second screen device, a first message. The first message may include an indication that a video is being presented by the second screen device. The first message may also include an indication of a user account (e.g., the second user account identifier). The determining that the first user account identifier matches the second user account identifier may further include receiving, from the first screen device, a second message. The second message may include a user account identifier associated with the first screen device (e.g., the first user account identifier). Processing logic may then determine that the first user account identifier and the second user account identifier are associated with the same user account. In some embodiments, the first message and/or second message may be sent responsive to a user action. For example, the first message may be sent responsive to the user selecting a video to present on the second screen device. As another example, the second message may be sent responsive to the user performing an action associated with the first application, such as opening the application or moving the application from a background mode to an active mode.

At block 422, in response to determining that the first user account identifier associated with the first application on the first screen device matches the second user account identifier associated with the second application on the second screen device, processing logic provides, via a UI of the first application on the first screen device, a UI element prompting the user to connect the first screen device with the second screen device. In some embodiments, the UI element may be presented to the user responsive to the first device receiving a response to a message, e.g., a response to the second message including an indication of the user account identifier. Operations of block 422 may share similar features with operations of block 402 of FIG. 4A.

At block 424, processing logic receives, via the UI element, an indication of a user request to connect the first screen device with the second screen device. At block 426, in response to receiving the indication of the user request to connect the first screen device with the second screen device, processing logic causes the first and second screen device to be paired. Operations of blocks 422 and 424 may share features in common with operations of blocks 404 and 406 of FIG. 4A.

At block 428, processing logic provides, for presentation in the user interface of the first application on the first screen device, additional information associated with the video that is concurrently presented on the second screen device. In some embodiments, multiple additional information options may be displayed via the first UI. For example, icons may be provided for navigating to comments associated with the content item, reviews, transactions related to the content item, additional content items related to the content item, a written description of the content item, etc. In some embodiments, a particular type of additional information may be chosen by a user on the second screen device (e.g., by navigating to an icon of the second UI) and that information (e.g., comments associated with the video) may be displayed on the first screen device responsive to the user input.

In some embodiments, causing the first and second devices to be paired may be performed without providing the UI element prompting the user to connect the devices via the first device. For example, responsive to a user action associated with the first device, a determination may be made whether the first screen device and the second screen device are associated with the same user account. The user action may include the user opening the first application on the first screen device, activating the first application from a background mode, interacting with the first UI of the first application (e.g., selecting a content item, selecting the same content item displayed on the second screen device, selecting an engagement activity, selecting an activity associated with the content item displayed on the second device, etc.), or the like. Determining the first screen device and the second screen device are associated with the same user account may include operations similar to those described in connection with block 420.

Figure 4D:
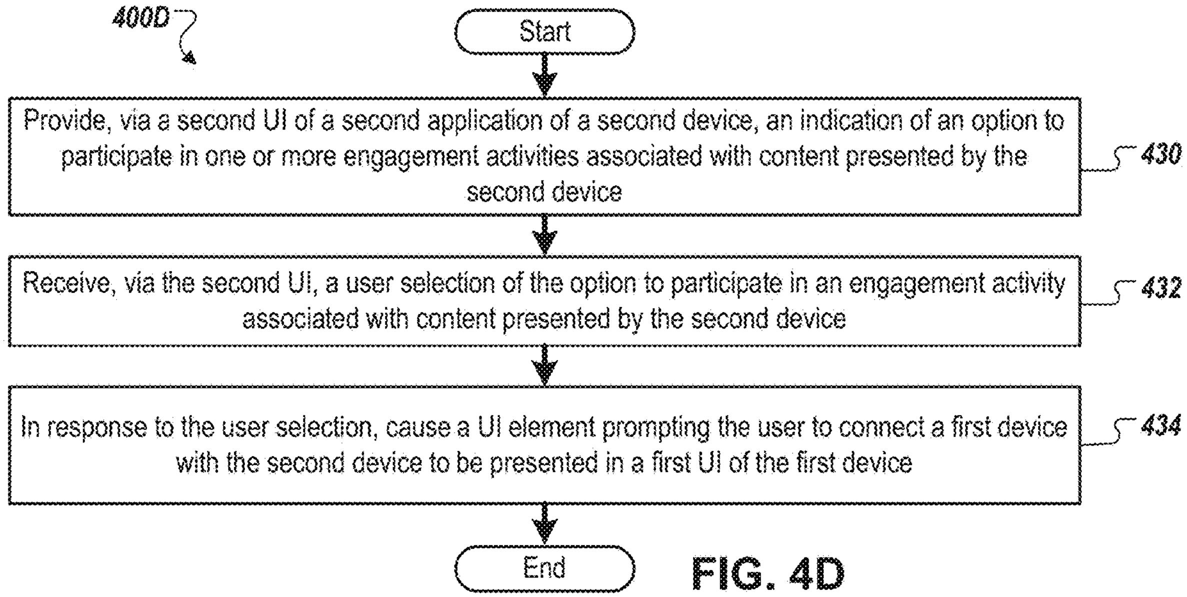
FIG. 4D depicts a flow diagram of a method for facilitating user participation in a selected engagement activity, according to some embodiments.

FIG. 4D depicts a flow diagram of a method 400D for facilitating user participation in a selected engagement activity, according to some embodiments. Method 400D is performed by processing logic that may comprise hardware (circuitry, dedicated logic, etc.), software (such as is run on a general purpose computer system or a dedicated machine), or a combination of both. In one implementation, the method is performed by an application of a second device (e.g., communication application 115B of FIG. 1), while in some other implementations one or more blocks of FIG. 4D may be performed by server 106 and/or communication application 115A of FIG. 1.

At block 430, processing logic provides, via a UI of an application of a second device, an indication of an option to participate in one or more engagement activities associated with content presented by the second device. The engagement activities may include viewing or entering comments (e.g., text comments) associated with the content; participating in a live chat associated with the content providing or viewing feedback (e.g., like/dislike, written or graded review, etc.) associated with the content, with a comment, or the like; engaging in a transaction associated with the content (e.g., subscribing to a channel providing the content, donating to a cause associated with the content, purchasing one or more items associated with the content, etc.); interacting with one or more advertisements associated with the content, or the like.

At block 432, processing logic receives, via the UI of the application on the second screen device, a user selection of the option to participate in the one or more engagement activities associated with content presented by the second device. The UI of the application of the second device may present some or all of the above engagement activities for user selection. For example, the user may select to view comments or participate in a live chat associated with the content.

In response to the user selection of one of the engagement activities, processing logic causes a UI element prompting the user to connect the first screen device with the second screen device to be presented in a UI of an application on the first device (block 434). In some embodiments, processing logic sends a message to the content platform (e.g., server 106), indicating the engagement activity selected by the user. In response, the content platform sends a message to the application of the first device with instructions to present the prompt.

Figure 4E:
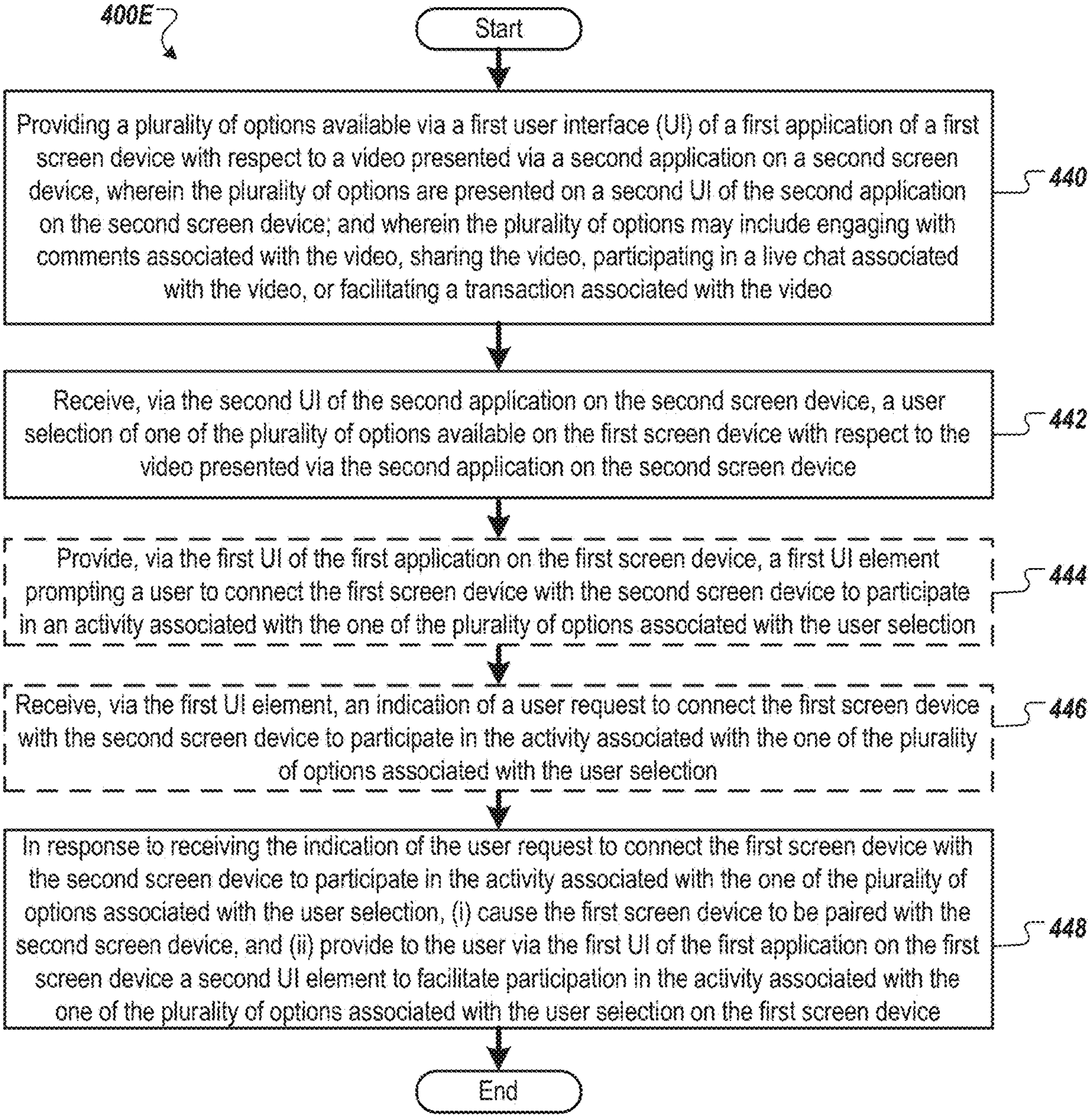
FIG. 4E depicts a flow diagram of a method for facilitating user participation in a selected engagement activity associated with content presented using a client device, according to some embodiments.

FIG. 4E depicts a flow diagram of a method 400E for facilitating user participation in a selected engagement activity associated with content presented using a client device, according to some embodiments. The method 400E is performed by processing logic that may comprise hardware (circuitry, dedicated logic, etc.), software (such as is run on a general purpose computer system or a dedicated machine), or a combination of both. In one implementation, the method is performed by server 106 (e.g., content engagement manager 150) of FIG. 1, while in some other implementations one or more blocks of FIG. 4E may be performed by communication application 115A and/or communication application 115B of FIG. 1.

At block 440, processing logic provides a plurality of options available via a first UI of a first application of a first screen device with respect to a video presented via a second application on a second screen device. The plurality of options are presented on a second UI of the second application on the second screen device. In some embodiments, the plurality of options may be presented in association with a content item (e.g., video) that is being presented. The plurality of options may include a comment section associated with the video, feedback options (e.g., like/dislike, rate/review, etc.), transaction options (e.g., subscribe to a channel, purchase an affiliated product, donate to an affiliated cause, etc.), live chat, sharing the video, or the like.

At block 442, processing logic receives, via the second UI of the second application on the second screen device, a user selection of one of the plurality of options available on the first screen device with respect to the video presented via the second application on the second screen device. In some embodiments, a user may use an electronic device (e.g., a television remote, a gaming remote controller, etc.) to navigate to an icon of the second UI to select an engagement activity to participate in.

At block 444, processing logic optionally provides, via the first UI of the first application on the first screen device, a first UI element prompting a user to connect the first screen device with the second screen device to participate in an activity associated with the one of the plurality of options associated with the user selection. Operations of block 444 may share features in common with operations of block 402 of FIG. 4A. In some embodiments, the first UI element may present a choice to a user of whether or not to connect the two devices. In some embodiments, the first UI element may present a choice to a user of whether or not to participate in the selected activity. In some embodiments, the devices may be connected without providing the first UI element to the user, e.g., upon detecting a user action associated with the first UI. For example, upon receiving, via the second UI, a user selection of an engagement activity to participate in via the first device, an indication of the user's intention to connect the devices may be stored. The devices may be connected without further selection by the user, e.g., responsive to an interaction of the user with the first application, responsive to determining that the first device and the second device are associated with the same user account, or the like. In some embodiments, upon selecting an engagement activity via the second UI, the second UI may display a message instructing the user to open the first application on the first device. The message may indicate that the devices will be connected upon opening the application.

At block 446, processing logic receives, via the first UI element, an indication of a user request to connect the first screen device with the second screen device to participate in the activity associated with the one or the plurality of options associated with the user selection. At block 448, in response to receiving the indication of the user request to connect the first screen device with the second screen device to participate in the activity associated with the one of the plurality of options associated with the user selection, processing logic causes the first screen device to be paired with the second screen device and provides to the user via the first UI of the first application on the first screen device a second UI element to facilitate participation in the activity associated with the one of the plurality of options associated with the user selection on the first screen device. In some embodiments, performance of operations associated with block 448 may be performed upon receiving the user selection of the plurality of options, e.g., in embodiments where the first UI element prompting the user to connect the devices is not displayed via the first application. An example UI that may be used to facilitate participation in an engagement activity is discussed in connection with FIG. 2C.

Figure 4F:
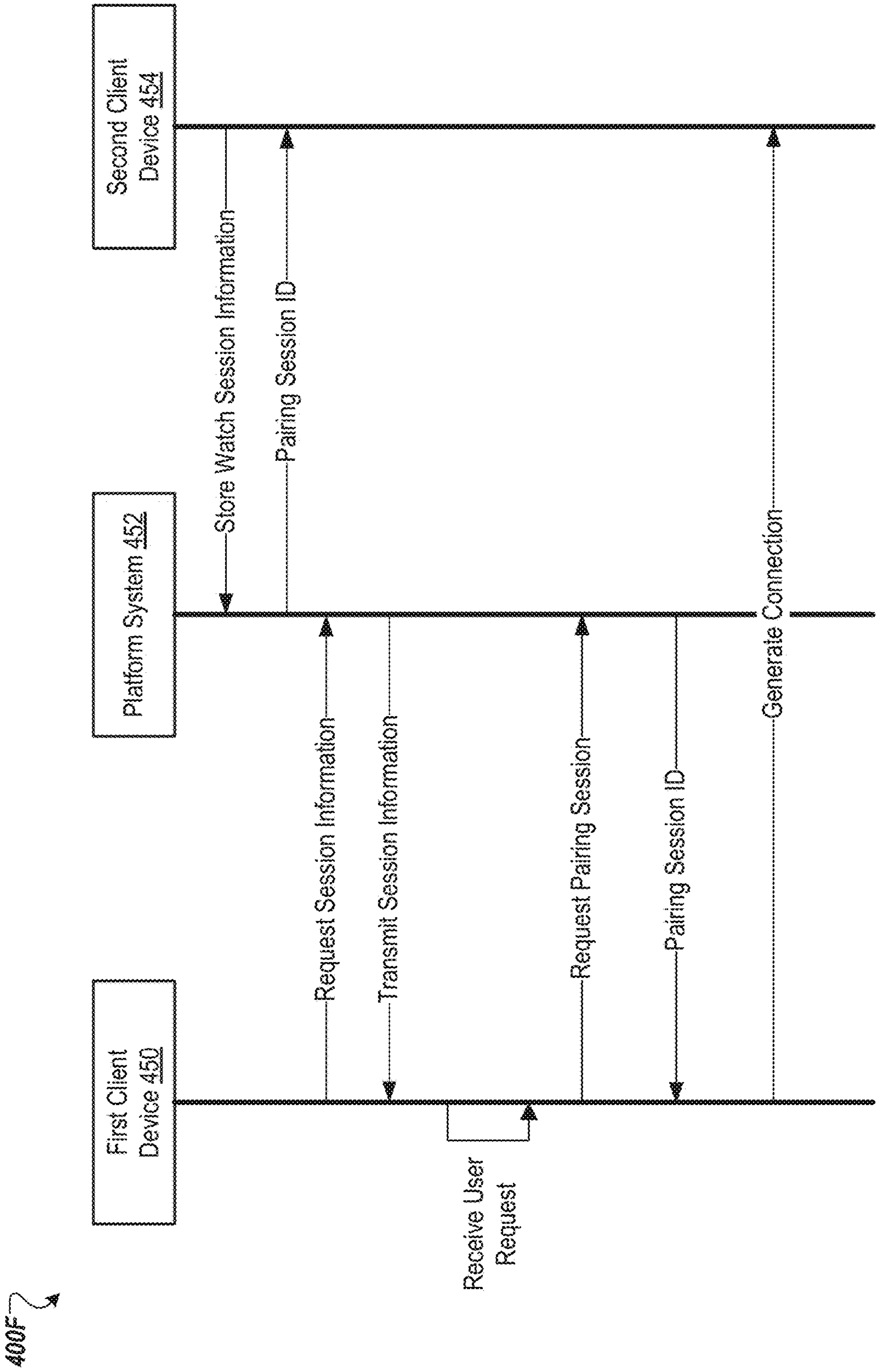
FIG. 4F depicts a diagram of a system for pairing client devices, according to some embodiments.

FIG. 4F depicts a diagram of a system 400F for pairing client devices, according to some embodiments. System 400F includes a first client device 450 (e.g., a device facilitating one or more engagement activities associated with a content item, client device 110A of FIG. 1, etc.), a second client device (e.g., a device facilitating consumption of a content item, client device 110B of FIG. 1, etc.), and a platform system 452 (e.g., content platform system 102 of FIG. 1). Platform system 452 may include platforms for downloading or streaming content items, generating communication connections between devices, etc.

A user may initiate presentation of a content item via the second client device 454. Second client device 454 may transmit to platform system 452 data associated with the user watch session, which can be saved at platform system 452. For example, the saved data can include a user account identifier associated with an application on the second client device presenting the content item, information about the watch session such as start time, information identifying the second client device, an identifier of the content item presented, etc. In some embodiments, the second client device 454 may send, to platform system 452, a request to store watch session information responsive to a user request, e.g., a request to pair the second client device 454 to first client device 450, a request to participate in an engagement activity associated with the content item, etc. The request to store watch session information may include one or more indications associated with such user requests. In some embodiments, platform system 452 may prepare and transmit a pairing session ID to second client device 454 for future use in pairing with first client device 450. In some embodiments, the pairing session ID may be transmitted at another time (e.g., before or after platform system 452 transmits a pairing session ID to first client device 450).

First client device 450 may send a request to platform system 452. The request may include a query associated with an active watch session on another device. Platform system 452 may utilize user account ID, previous history (e.g., stored device IDs associated with an application of the first client device 450), network information, etc., to associate the request from first client device 450 to the stored data associated with second client device 454. Platform system 452 may respond to the request by providing indications of the stored watch session information. In some embodiments, platform system 452 may transmit data indicative of the watch session (e.g., start time, displayed content item, etc.). In some embodiments, platform system 452 may transmit instructions for first client device 450 to present a UI element prompting a user to connect first client device 450 to second client device 454. Responsive to receiving the transmission from platform system 452, first client device 450 may present the UI element to the user.

First client device 450 may receive a user request to connect the first client device 450 to second client device 454 via the UI element. First client device 450 may send a request to platform system 452 to initiate a pairing session with second client device 454. Responsive to receiving the request from first client device 450, platform system 452 may initiate operations targeting connection of the client devices.

Platform system 452 may provide a pairing session ID (e.g., session token) to first client device 450. First client device 450 may transmit (e.g., via platform system 452) a request to connect to second client device 454 (e.g., including an indication of the pairing session ID). Second client device 454 may utilize the stored pairing session ID (e.g., as transmitted by platform system 452) and the pairing session ID transmitted by first client device 450 to generate a connection between first client device 450 and second client device 454. Generating a connection between first client device 450 and second client device 454 may include multiple connections, e.g., first client device 450 may generate a connection with platform system 452, and second client device 454 may generate a connection with platform system 452. Generating this connections (e.g., via platform system 452) may facilitate passing messages, information, commands, etc., between first client device 450 and second client device 454.

In some embodiments, a pairing session ID may be provided to second client device 454 as a later operation, e.g., providing the pairing session ID to second client device 454 may be performed responsive to platform system 452 receiving the request to initiate a pairing session from first client device 450. In some embodiments, second client device 454 may initiate generation of the connection between first client device 450 and second client device 454 (e.g., after a pairing session ID is supplied to first client device 450 and second client device 454). In some embodiments, first client device 450 may initiate a connection (e.g., utilizing the pairing session ID) with platform system 452 and second client device 454 may initiate a connection (e.g., utilizing the pairing session ID) with platform system 452. The connections of first client device 450 to platform system 452 and second client device 454 to platform system 452 may facilitate communication between first client device 450 and second client device 454.

In some embodiments, a pairing session may be initiated without displaying a prompt to a user on first client device 450.

Figure 5:
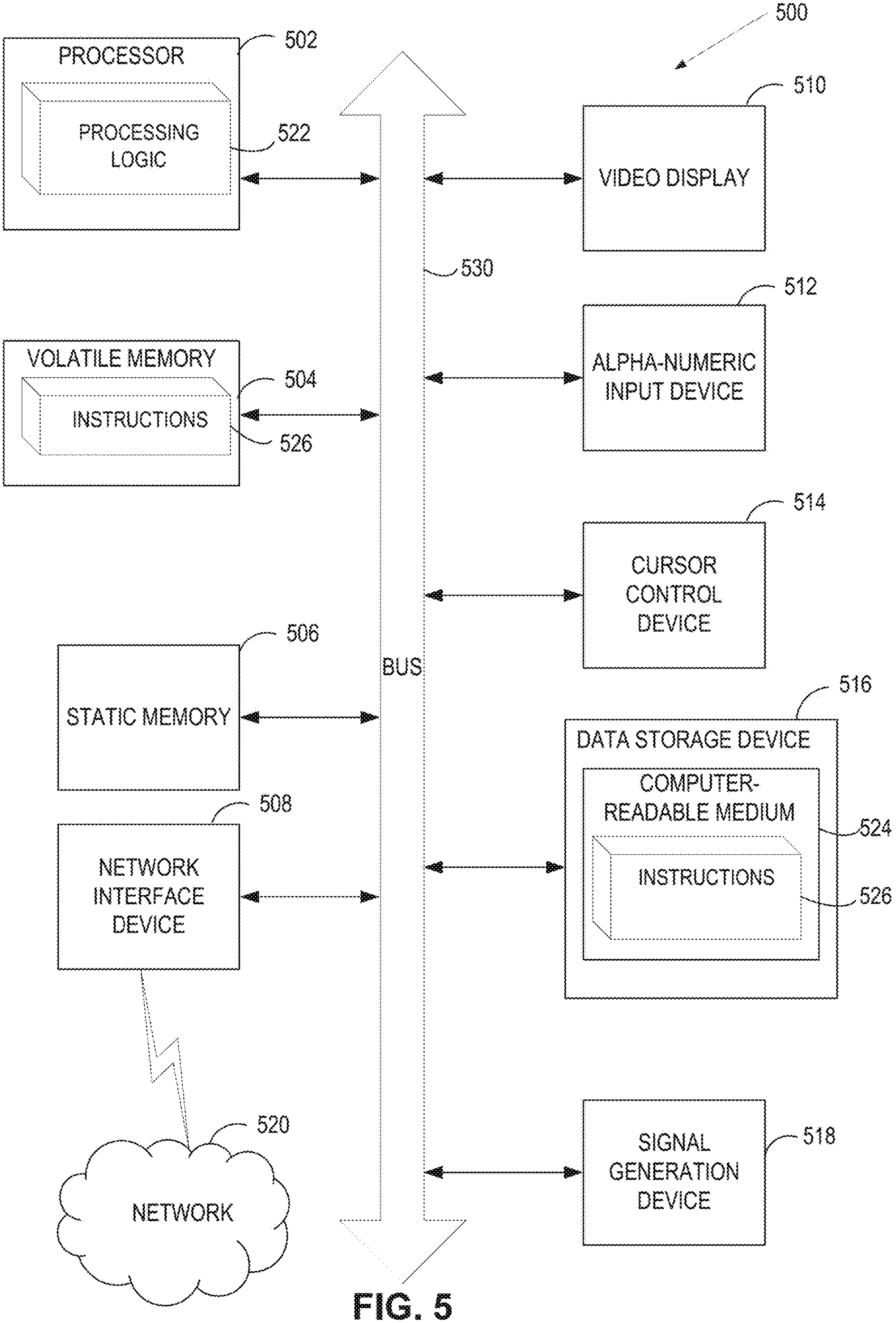
FIG. 5 is a block diagram illustrating an exemplary computer system, in accordance with implementations of the present disclosure.

FIG. 5 is a block diagram illustrating an exemplary computer system 500, according to some embodiments. Computer system 500 may be one of server machines 106 or client devices 110A-B of FIG. 1. The machine may operate in the capacity of a server or an endpoint machine in an endpoint-server network environment, or as a peer machine in a peer-to-peer (or distributed) network environment. The machine may be a television, a personal computer (PC), a tablet PC, a set-top box (STB), a Personal Digital Assistant (PDA), a cellular telephone, a web appliance, a server, a network router, switch, or bridge, a gaming console, a digital media streaming device, or any machine capable of executing a set of instructions (sequential or otherwise) that specify actions to be taken by that machine. Further, while only a single machine is illustrated, the terms "machine," "computer," "processing device," etc., shall also be taken to include any collection of machines that individually or jointly execute a set (or multiple sets) of instructions to perform any one or more of the methodologies discussed herein.

Example computer system 500 includes a processing device (processor) 502, a volatile memory 504 (e.g., read-only memory (ROM), flash memory, dynamic random access memory (DRAM) such as synchronous DRAM (SDRAM), double data rate (DDR SDRAM), etc.), a static memory 506 (e.g., flash memory, static random access memory (SRAM), etc.), and a data storage device 516, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 502 may also be one or more special-purpose processing devices such as an application specific integrated circuit (ASIC), a field programmable gate array (FPGA), a digital signal processor (DSP), network processor, or the like. The processor 502 is configured to execute instructions 522 (e.g., for facilitating user participation in one or more engagement activities associated with a content item) for performing operations discussed herein.

Computer system 500 can further include a network interface device 508. The computer system 500 also can include a video display unit 510 (e.g., a liquid crystal display (LCD) or a cathode ray tube (CRT)), an alpha-numeric input device 512 (e.g., a keyboard, and alphanumeric keyboard, a motion sensing input device, touch screen), a cursor control device 514 (e.g., a mouse), and a signal generation device 518 (e.g., a speaker).

Data storage device 516 can include a non-transitory machine-readable storage medium 524 (also computer-readable storage medium) on which is stored one or more sets of instructions 526 (e.g., for obtaining optimized encoder parameter settings) embodying any one or more of the methodologies or functions described herein. The instructions can also reside, completely or at least partially, within the volatile memory 504 and/or within the processor 502 during execution thereof by the computer system 500, the volatile (e.g., main) memory 504 and the processor 502 also constituting machine-readable storage media. The instructions can further be transmitted or received over a network 520 via the network interface device 508.

While the computer-readable storage medium 524 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user may opt-in or opt-out of participating in such data collection activities.

What is claimed is:

1. A method comprising:

detecting, by a first screen device, a user action with respect to a user interface (UI) of a first application on the first screen device, wherein the user action is at least one of:

a user opening the first application on the first screen device, or the user selecting the first application from a list of applications opened on the first screen device to move the first application from a background mode to an active mode;

responsive to detecting the user action, providing, in the UI of the first application on the first screen device, a UI element prompting the user to connect the first screen device with a second screen device that is presenting a video to the user, wherein the UI element prompting the user to connect the first screen device to the second screen device is provided while a second application on the second screen device is presenting the video to the user, wherein the first application and the second application are each associated with a user account on a content platform;

receiving, via the UI element, an indication of a user request to connect the first screen device with the second screen device;

in response to receiving the indication of the user request to connect the first screen device with the second screen device, causing the first screen device to be paired with the second screen device, to allow the user to participate, on the first screen device, in a live chat between a plurality of other users with respect to the video presented by the second application on the second screen device; and allowing, via the first screen device paired with the second screen device, the user to participate in the live chat between the plurality of other users with respect to the video that is concurrently presented by the second application on the second screen device.

2. The method of claim 1, wherein the UI element prompting the user to connect the first screen device with the second screen device is provided via the UI of the first application on the first screen device upon the user selecting an option to participate in the live chat between the plurality of other users with respect to the video presented on the second screen device, wherein the UI element prompts the user to connect the first screen device with the second screen device to participate in the live chat.

3. The method of claim 1, wherein providing, in the UI of the first application on the first screen device the UI element prompting the user to connect the first screen device with the second screen device comprises:

in response to the detected user action, determining that the second application on the second screen device is associated with the user account and is presenting the video; and in response to determining that the second application is associated with the user account and is presenting the video, causing the UI element prompting the user to connect the first screen device with the second screen device to be presented on the UI of the first application.

4. The method of claim 1, further comprising receiving, via the UI of the first application of the first screen device, a message of the user with respect to the video that is concurrently presented on the second screen device, and causing the message of the user to be included in the live chat associated with the video.

5. A method comprising:

obtaining, by a first screen device, a first indication that a user is interested in connecting the first screen device to a second screen device, wherein obtaining the first indication comprises detecting a user action with respect to a first application on the first screen device, wherein the user action is at least one of:

the user opening the first application on the first screen device, or the user selecting the first application from a list of applications opened on the first screen device to move the first application from a background mode to an active mode;

responsive to obtaining the first indication, providing, via a user interface (UI) of the first application on the first screen device, a UI element prompting the user to connect the first screen device with the second screen device, wherein the UI element prompting the user to connect the first screen device to the second screen device is provided while a second application on the second screen device is presenting a video to the user, wherein the first application and the second application are each associated with a user account on a content platform;

receiving, via the UI element, an indication of a user request to connect the first screen device with the second screen device;

in response to receiving the indication of the user request to connect the first screen device with the second screen device, causing the first screen device to be paired with the second screen device, to allow the user to view, on the first screen device, one or more comments provided by one or more other users for the video presented by the second application on the second screen device; and providing, for presentation in the UI of the first application of the first screen device paired with the second screen device, the one or more comments provided by the one or more other users for the video that is concurrently presented by the second application on the second screen device.

6. The method of claim 5, wherein the UI element prompting the user to connect the first screen device with the second screen device is provided via the UI of the first application on the first screen device upon the user selecting an option to view the one or more comments for the video presented on the second screen device, wherein the UI element prompts the user to connect the first screen device with the second screen device to view comments.

7. The method of claim 5, wherein providing, via the UI of the first application on the first screen device, the UI element prompting the user to connect the first screen device with the second screen device further comprises:

in response to the detected user action, determining that the second application on the second screen device is associated with the user account and is presenting the video;

determining that the user has not dismissed a previous prompt to connect the first screen device to the second screen device during a current watch session; and in response to determining that the second application is associated with the user account and is presenting the video, causing the UI element prompting the user to connect the first screen device with the second screen device to be presented on the UI of the first application.

8. The method of claim 5, further comprising:

receiving, via the UI of the first application on the first screen device paired with the second screen device presenting the video to the user, a user request to adjust presentation of the video on the second screen device; and responsive to the user request to adjust presentation of the video, causing presentation of the video on the second screen device to be adjusted.

9. The method of claim 5, further comprising receiving, via the UI of the first application of the first screen device paired with the second screen device, a new comment of the user with respect to the video that is concurrently presented on the second screen device.

10. The method of claim 5, further comprising receiving, via the UI of the first application of the first screen device paired with the second screen device, an indication of feedback of the user with respect to at least one of the one or more comments provided by the one or more other users for the video that is concurrently presented on the second screen device, the feedback comprising an indication of a user approval or disapproval of a respective comment.

11. A non-transitory computer readable medium comprising instructions, which when executed by a processing device of a first screen device, cause the processing device to perform operations comprising:

obtaining, by the first screen device, a first indication that a user is interested in connecting the first screen device to a second screen device, wherein obtaining the first indication comprises detecting a user action with respect to a first application on the first screen device, wherein the user action is at least one of:

the user opening the first application on the first screen device, or the user selecting the first application from a list of applications opened on the first screen device to move the first application from a background mode to an active mode;

responsive to obtaining the first indication, providing, via a user interface (UI) of the first application on the first screen device, a UI element prompting the user to connect the first screen device with the second screen device, wherein the UI element prompting the user to connect the first screen device to the second screen device is provided while a second application on the second screen device is presenting a video to the user, wherein the first application and the second application are each associated with a user account on a content platform;

receiving, via the UI element, an indication of a user request to connect the first screen device with the second screen device;

in response to receiving the indication of the user request to connect the first screen device with the second screen device, causing the first screen device to be paired with the second screen device, to allow the user to view, on the first screen device, one or more comments provided by one or more other users for the video presented by the second application on the second screen device; and providing, for presentation in the UI of the first application of the first screen device paired with the second screen device, the one or more comments provided by the one or more other users for the video that is concurrently presented by the second application on the second screen device.

12. The non-transitory computer readable medium of claim 11, wherein the UI element prompting the user to connect the first screen device with the second screen device is provided via the UI of the first application on the first screen device upon the user selecting an option to view the one or more comments for the video presented on the second screen device, wherein the UI element prompts the user to connect the first screen device with the second screen device to view comments.

13. The non-transitory computer readable medium of claim 11, wherein providing, via the UI of the first application on the first screen device, the UI element prompting the user to connect the first screen device with the second screen device further comprises:

in response to the detected user action, determining that the second application on the second screen device is associated with the user account and is presenting the video;

determining that the user has not dismissed a previous prompt to connect the first screen device to the second screen device during a current watch session; and in response to determining that the second application is associated with the user account and is presenting the video, causing the UI element prompting the user to connect the first screen device with the second screen device to be presented on the UI of the first application.

14. The non-transitory computer readable medium of claim 11, wherein causing the first screen device to be paired with the second screen device comprises:

generating a first connection between the first screen device and a server; and generating a second connection between the second screen device and the server.

15. The non-transitory computer readable medium of claim 11, the operations further comprising:

receiving, via the UI of the first application on the first screen device paired with the second screen device presenting the video to the user, a user request to adjust presentation of the video on the second screen device; and responsive to the user request to adjust presentation of the video, causing presentation of the video on the second screen device to be adjusted.

16. The non-transitory computer readable medium of claim 11, the operations further comprising identifying a plurality of comments provided by a plurality of users for the video presented on the second screen device, the plurality of comments comprising the one or more comments provided by the one or more other users.

17. The non-transitory computer readable medium of claim 11, the operations further comprising receiving, via the UI of the first application of the first screen device paired with the second screen device, a new comment of the user with respect to the video that is concurrently presented on the second screen device.

18. The non-transitory computer readable medium of claim 11, the operations further comprising receiving, via the UI of the first application of the first screen device paired with the second screen device, an indication of feedback of the user with respect to at least one of the one or more comments provided by the one or more other users for the video that is concurrently presented on the second screen device, the feedback comprising an indication of a user approval or disapproval of a respective comment.

19. A system for a first screen device, comprising:

a memory; and a processing device, coupled to the memory, to perform operations comprising:

obtaining, by the first screen device, a first indication that a user is interested in connecting the first screen device to a second screen device, wherein obtaining the first indication comprises detecting a user action with respect to a first application on the first screen device, wherein the user action is at least one of:

the user opening the first application on the first screen device, or the user selecting the first application from a list of applications opened on the first screen device to move the first application from a background mode to an active mode;

responsive to obtaining the first indication, providing, via a user interface (UI) of the first application on the first screen device, a UI element prompting the user to connect the first screen device with the second screen device, wherein the UI element prompting the user to connect the first screen device to the second screen device is provided while a second application on the second screen device is presenting a video to the user, wherein the first application and the second application are each associated with a user account on a content platform;

receiving, via the UI element, an indication of a user request to connect the first screen device with the second screen device;

in response to receiving the indication of the user request to connect the first screen device with the second screen device, causing the first screen device to be paired with the second screen device, to allow the user to view, on the first screen device, one or more comments provided by one or more other users for the video presented by the second application on the second screen device; and providing, for presentation in the UI of the first application of the first screen device paired with the second screen device, the one or more comments provided by the one or more other users for the video that is concurrently presented by the second application on the second screen device.

20. A non-transitory computer readable medium comprising instructions, which when executed by a processing device of a first screen device, cause the processing device to perform operations comprising:

detecting, by the first screen device, a user action with respect to a user interface (UI) of a first application on the first screen device, wherein the user action is at least one of:

a user opening the first application on the first screen device, or the user selecting the first application from a list of applications opened on the first screen device to move the first application from a background mode to an active mode;

responsive to detecting the user action, providing, in the UI of the first application on the first screen device, a UI element prompting the user to connect the first screen device with a second screen device that is presenting a video to the user, wherein the UI element prompting the user to connect the first screen device to the second screen device is provided while a second application on the second screen device is presenting a video to the user, wherein the first application and the second application are each associated with a user account on a content platform;

receiving, via the UI element, an indication of a user request to connect the first screen device with the second screen device;

in response to receiving the indication of the user request to connect the first screen device with the second screen device, causing the first screen device to be paired with the second screen device, to allow the user to participate, on the first screen device, in a live chat between a plurality of other users with respect to the video presented by the second application on the second screen device; and allowing, via the first screen device paired with the second screen device, the user to participate in the live chat between the plurality of other users with respect to the video that is concurrently presented by the second application on the second screen device.

21. The non-transitory computer readable medium of claim 20, wherein the UI element prompting the user to connect the first screen device with the second screen device is provided via the UI of the first application on the first screen device upon the user selecting an option to participate in the live chat between the plurality of other users with respect to the video presented on the second screen device, wherein the UI element prompts the user to connect the first screen device with the second screen device to participate in the live chat.

22. The non-transitory computer readable medium of claim 20, wherein providing, in the UI of the first application on the first screen device the UI element prompting the user to connect the first screen device with the second screen device comprises:

in response to the detected user action, determining that the second application on the second screen device is associated with the user account and is presenting the video; and in response to determining that the second application is associated with the first user account and is presenting the video, causing the UI element prompting the user to connect the first screen device with the second screen device to be presented on the UI of the first application.

23. The non-transitory computer readable medium of claim 20, the operations further comprising receiving, via the UI of the first application of the first screen device, a message of the user with respect to the video that is concurrently presented on the second screen device, and causing the message of the user to be included in the live chat associated with the video.

24. A system comprising:

a memory; and a processing device coupled to the memory, the processing device configured to perform operations comprising:

detecting, by a first screen device, a user action with respect to a user interface (UI) of a first application on the first screen device, wherein the user action is at least one of:

a user opening the first application on the first screen device, or the user selecting the first application from a list of applications opened on the first screen device to move the first application from a background mode to an active mode;

responsive to detecting the user action, providing, in the UI of the first application on the first screen device, a UI element prompting the user to connect the first screen device with a second screen device that is presenting a video to the user, wherein the UI element prompting the user to connect the first screen device to the second screen device is provided while a second application on the second screen device is presenting the video to the user, wherein the first application and the second application are each associated with a user account on a content platform;

receiving, via the UI element, an indication of a user request to connect the first screen device with the second screen device;

in response to receiving the indication of the user request to connect the first screen device with the second screen device, causing the first screen device to be paired with the second screen device, to allow the user to participate, on the first screen device, in a live chat between a plurality of other users with respect to the video presented by the second application on the second screen device; and allowing, via the first screen device paired with the second screen device, the user to participate in the live chat between the plurality of other users with respect to the video that is concurrently presented by the second application on the second screen device.

* * * * *